US012610157B2

(12) United States Patent　　　　(10) Patent No.: US 12,610,157 B2

Shim et al.　　　　(45) Date of Patent: Apr. 21, 2026

(54) IMAGE SENSOR HAVING HIGH DYNAMIC RANGE

(71) Applicant: Samsung Electronics Co., Ltd., Suwon-si (KR)

(72) Inventors: Heesung Shim, Suwon-si (KR); Jaekyu Lee, Suwon-si (KR); Seungsik Kim, Suwon-si (KR); Ingyu Baek, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 185 days.

(21) Appl. No.: 18/534,208

(22) Filed: Dec. 8, 2023

(65) Prior Publication Data

US 2024/0205556 A1　　　Jun. 20, 2024

(30) Foreign Application Priority Data

Dec. 14, 2022　　(KR) ........................ 10-2022-0175225

(51) Int. Cl.

| *H04N 25/51* | (2023.01) |
| *H04N 25/42* | (2023.01) |
| *H04N 25/53* | (2023.01) |
| *H04N 25/57* | (2023.01) |
| *H04N 25/59* | (2023.01) |
| *H04N 25/616* | (2023.01) |

(Continued)

(52) U.S. Cl.

CPC ............. *H04N 25/51* (2023.01); *H04N 25/42* (2023.01); *H04N 25/53* (2023.01); *H04N 25/57* (2023.01); *H04N 25/59* (2023.01); *H04N 25/616* (2023.01); *H04N 25/766*

(2023.01); *H04N 25/771* (2023.01); *H04N 25/778* (2023.01); *H04N 25/78* (2023.01); *H04N 25/7795* (2023.01)

(58) Field of Classification Search

CPC ........ H04N 25/42; H04N 25/51; H04N 25/53; H04N 25/57; H04N 25/59; H04N 25/616; H04N 25/71; H04N 25/75; H04N 25/766; H04N 25/771; H04N 25/778; H04N 25/7795; H04N 25/78

See application file for complete search history.

(56) References Cited

U.S. PATENT DOCUMENTS

| 8,575,533 B2 * | 11/2013 | Yen | ........................ | H04N 25/59 |
| | | | | 250/214 AG |
| 9,654,712 B2 | 5/2017 | Hong | | |

(Continued)

FOREIGN PATENT DOCUMENTS

| WO | 2022/209126 A1 | 10/2022 |

OTHER PUBLICATIONS

Extended European Search Report dated May 15, 2024 for corresponding European Application No. 23216054.9.

*Primary Examiner* — Lin Ye
*Assistant Examiner* — Chriss S Yoder, III
(74) *Attorney, Agent, or Firm* — P.L.C. HARNESS, DICKEY & PIERCE, P.L.C.

(57) ABSTRACT

An image sensor according to some example embodiments of the present inventive concepts may operate in a global shutter mode, and each pixel circuit may support a high conversion gain (HCG) mode and a low conversion gain (LCG) mode so as to have high dynamic range (HDR). Accordingly, the image sensor according to some example embodiments of the present inventive concepts may have HDR and may generate a high-quality image.

19 Claims, 24 Drawing Sheets

(51) Int. Cl.

| | |
|---|---|
| *H04N 25/76* | (2023.01) |
| *H04N 25/766* | (2023.01) |
| *H04N 25/771* | (2023.01) |
| *H04N 25/778* | (2023.01) |
| *H04N 25/78* | (2023.01) |

(56) References Cited

U.S. PATENT DOCUMENTS

| | | | |
|---|---|---|---|
| 10,560,646 B2 | 2/2020 | Milkov et al. | |
| 10,939,059 B2 | 3/2021 | Duan et al. | |
| 11,094,726 B2 | 8/2021 | Simony | |
| 11,114,482 B2 * | 9/2021 | Ma | H04N 25/771 |
| 12,058,460 B2 * | 8/2024 | Choi | H10F 39/8037 |
| 2010/0079632 A1 * | 4/2010 | Walschap | H04N 25/77 |
| | | | 348/294 |
| 2018/0115731 A1 | 4/2018 | Lee et al. | |
| 2020/0043971 A1 * | 2/2020 | Sugawa | H10D 30/601 |
| 2020/0389614 A1 * | 12/2020 | Benjaram | H10F 39/802 |
| 2021/0136299 A1 | 5/2021 | Hynecek | |
| 2022/0191416 A1 * | 6/2022 | Fowler | H04N 25/78 |
| 2022/0247943 A1 | 8/2022 | Zhan et al. | |

* cited by examiner

RCS3

SCS3

IMAGE SENSOR HAVING HIGH DYNAMIC RANGE

CROSS-REFERENCE TO RELATED APPLICATIONS

This application claims priority under 35 U.S.C. § 119 to Korean Patent Application No. 10-2022-0175225 filed on Dec. 14, 2022, in the Korean Intellectual Property Office, the disclosures of which are incorporated by reference herein in their entireties.

BACKGROUND

Example embodiments of the present inventive concepts described herein relate to image sensors.

An image sensor is a device that converts an optical image into an electrical signal. Nowadays, with the development of computer and communication industries, there is an increasing demand on a high-performance image sensor in various electronic devices such as a digital camera, a camcorder, a personal communication system (PCS), a game console, a security camera, a medical micro camera, a robot, and the like. In the meantime, when an image sensor has a narrow dynamic range, an image obtained by the image sensor may be distorted, or the actual color of the subject may not be accurately expressed.

SUMMARY

Some example embodiments of the present inventive concepts provide an image sensor having a high dynamic range (HDR).

According to some example embodiments, an image sensor may include a plurality of pixels positioned in a plurality of rows and a plurality of columns. Each pixel of the plurality of pixels may include a photodiode configured to generate a charge in response to an incident light; a first floating diffusion node configured to store the charge generated by the photodiode; a second floating diffusion node selectively connected to the first floating diffusion node and configured to store the charge generated by the photodiode; a first capacitor selectively connected to an output node and configured to store a charge corresponding to a first reset voltage level of the first floating diffusion node in a state where the first floating diffusion node is electrically disconnected from the second floating diffusion node; a second capacitor selectively connected to the output node and configured to store a charge corresponding to a first signal voltage level of the first floating diffusion node in the state where the first floating diffusion node is electrically disconnected from the second floating diffusion node; a third capacitor selectively connected to the output node and configured to store a charge corresponding to a second reset voltage level of the first floating diffusion node in a state where the first floating diffusion node is electrically connected to the second floating diffusion node; a fourth capacitor selectively connected to the output node and configured to store a charge corresponding to a second signal voltage level of the first floating diffusion node in the state where the first floating diffusion node is electrically connected to the second floating diffusion node; and a reset transistor connected to the second floating diffusion node and configured to reset the first floating diffusion node and the output node.

According to some example embodiments, an image sensor may include a pixel array including a plurality of pixels. Each pixel of the plurality of pixels may include a photodiode configured to generate a charge in response to an incident light; a high conversion gain (HCG) capacitor corresponding to a first floating diffusion node and configured to integrate the charge generated by the photodiode; a low conversion gain (LCG) capacitor corresponding to a second floating diffusion node spaced from the first floating diffusion node and configured to integrate the charge generated by the photodiode; a dual conversion gain transistor configured to electrically connect or disconnect the first floating diffusion node and the second floating diffusion node; a source follower configured to amplify a voltage level of the first floating diffusion node and to output the amplified voltage level to a first output node; a first reset capacitor corresponding to a second output node spaced from the first output node and configured to store a charge corresponding to a reset level of the first floating diffusion node in a state where the dual conversion gain transistor is turned off; a first sampling transistor connected between the first reset capacitor and the second output node and configured to sample a charge that is stored in the first reset capacitor; a first signal capacitor corresponding to the second output node and configured to store a charge corresponding to a signal level of the first floating diffusion node in the state where the dual conversion gain transistor is turned off; a second sampling transistor connected between the first signal capacitor and the second output node and configured to sample a charge that is stored in the first signal capacitor; a second reset capacitor corresponding to the second output node and configured to store a charge corresponding to a reset level of the first floating diffusion node in a state where the dual conversion gain transistor is turned on; a third sampling transistor connected between the second reset capacitor and the second output node and configured to sample a charge that is stored in the second reset capacitor; a second signal capacitor corresponding to the second output node and configured to store a charge corresponding to a signal level of the first floating diffusion node in the state where the dual conversion gain transistor is turned on; a fourth sampling transistor connected between the second signal capacitor and the second output node and configured to sample a charge that is stored in the second signal capacitor; and a precharge select transistor configured to electrically connect and disconnect the first output node and the second output node.

BRIEF DESCRIPTION OF THE DRAWINGS

The above and other objects and features of the present inventive concepts will become apparent by describing in detail some example embodiments thereof with reference to the accompanying drawings.

FIG. 4B is a timing diagram showing an example of control signals provided to the pixel PX in the read-out period ROP according to some example embodiments of the present inventive concepts.

FIGS. 5A, 5B, 5C, and 5D are diagrams showing an example of an operation of the pixel PX in the global signal dump period GSDP of FIG. 4A according to some example embodiments of the present inventive concepts.

FIGS. 6A, 6B, 6C, 6D, 6E, and 6F are diagrams illustrating an example of an operation of the pixel PX in the read-out period ROP of FIG. 4B according to some example embodiments of the present inventive concepts.

FIGS. 8A and 8B are diagrams showing an example of an operation of the pixel PX_B of FIG. 7 in the global signal dump period GSDP according to some example embodiments of the present inventive concepts.

FIGS. 9A and 9B are diagrams showing an example of an operation of the pixel PX_B of FIG. 7 in the read-out period ROP according to some example embodiments of the present inventive concepts.

DETAILED DESCRIPTION

Hereinafter, some example embodiments of the present inventive concepts may be described in detail and clearly to such an extent that an ordinary one in the art easily implements the present inventive concepts.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Figure 1:
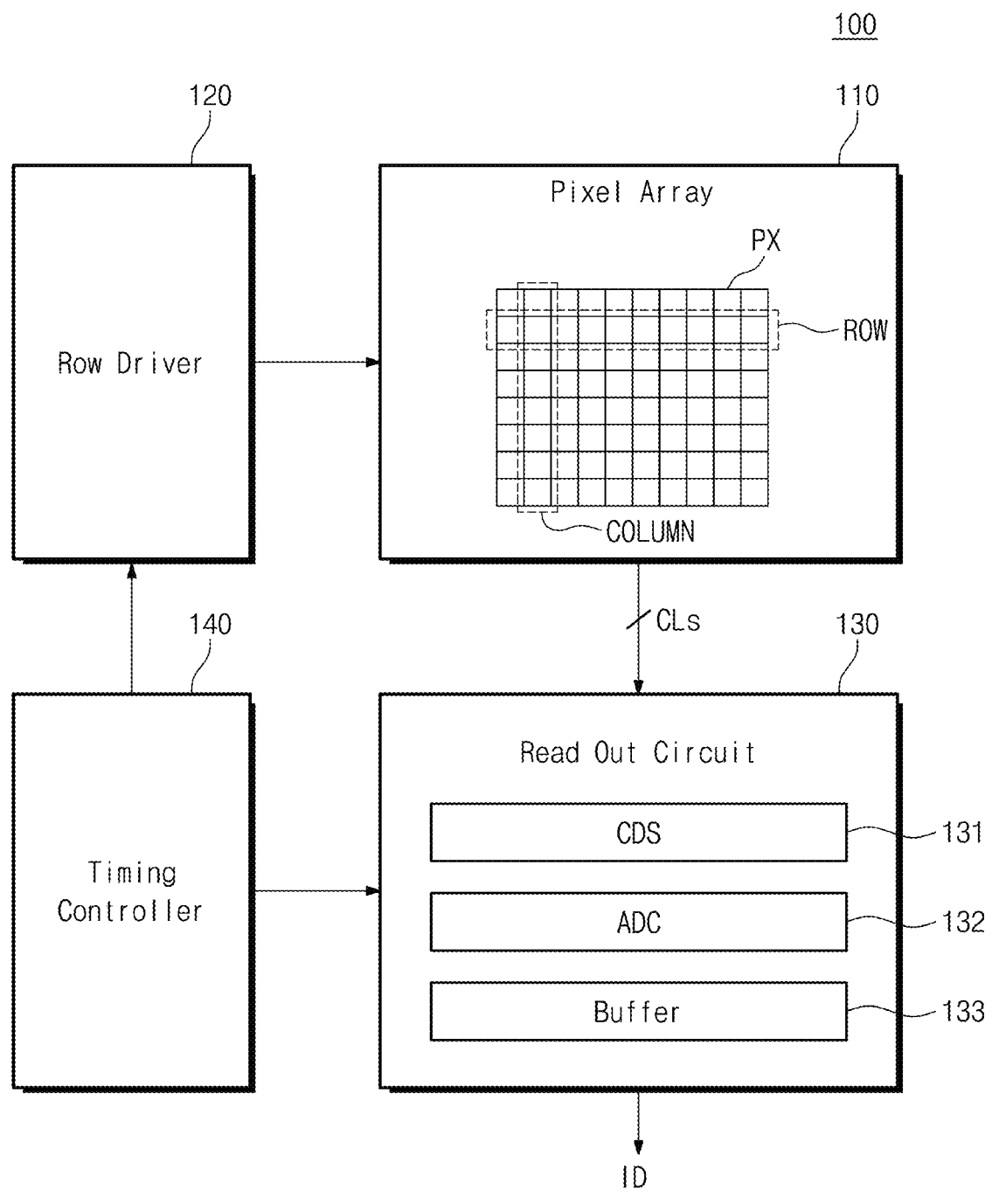
FIG. 1 is a block diagram illustrating an image sensor, according to some example embodiments of the present inventive concepts.

FIG. 1 is a block diagram illustrating an image sensor 100, according to some example embodiments of the present inventive concepts.

The image sensor 100 according to some example embodiments of the present inventive concepts may operate in a global shutter mode. In particular, according to some example embodiments of the present inventive concepts, the image sensor 100 may operate in a high conversion gain (hereinafter referred to as "HCG") mode and a low conversion gain (hereinafter referred to as "LCG") mode in a global signal dump period (hereinafter referred to as "GSDP") of a global shutter mode. The image sensor 100 may sample and hold information in the HCG mode in a first reset capacitor and a first signal capacitor and may sample and hold information in the LCG mode in a second reset capacitor and a second signal capacitor. Accordingly, the image sensor 100 according to some example embodiments of the present inventive concepts may have a HDR and may generate a high-quality image and thus may have improved operational performance.

Referring to FIG. 1, the image sensor 100 may include a pixel array 110, a row driver 120, a read-out circuit 130, and a timing controller 140.

The pixel array 110 may include a plurality of pixels PX. Each of the plurality of pixels PX (e.g., each pixel of the plurality of pixels PX) may include a photoelectric conversion element. For example, the photoelectric conversion element may include a photodiode, a photo transistor, a photo gate, a pinned photodiode, etc. Pixel signals corresponding to a subject may be generated by converting light detected by the photoelectric conversion element into an electrical signal. Each of the plurality of pixels PX may output pixel signals to the read-out circuit 130 through a corresponding column line among the plurality of column lines CLs.

In the pixel array 110, the plurality of pixels PX may be arranged in a matrix form in which a plurality of rows and a plurality of columns are arranged. For example, the plurality of pixels PX may be positioned in a plurality of rows and a plurality of columns. The plurality of pixels PX may be an active pixel sensor APS.

In some example embodiments, each of the plurality of pixels PX may include one of a red filter that passes (e.g., selectively transmits) light in a red wavelength region, a green filter that passes light in a green wavelength region, or a blue filter that passes light in a blue wavelength region. However, the present inventive concepts are not limited thereto. For example, each of the plurality of pixels PX may include a color filter passing light in a wavelength range (e.g., wavelength region) corresponding to various colors or may include a transparent filter. For example, each of the plurality of pixels PX may include one of a white color filter, a cyan color filter, a magenta color filter, and a yellow color filter.

In some example embodiments of the present inventive concepts, each pixel PX may include an HCG capacitor and an LCG capacitor that integrate charges generated by the photoelectric conversion element. To effectively integrate charges generated by the photoelectric conversion element in an environment where the intensity of light is weak, the HCG capacitor may have a relatively small capacity. To effectively integrate charges generated by the photoelectric conversion element in an environment where the intensity of light is strong, the LCG capacitor may have a relatively large capacity. For example, each of the HCG capacitor and the LCG capacitor may correspond to a floating diffusion node (hereinafter referred to as "FD").

In some example embodiments of the present inventive concepts, each pixel PX may include a first reset capacitor and a first signal capacitor that sample and hold information corresponding to charges integrated in the HCG capacitor. Moreover, each pixel PX may include a second reset capacitor and a second signal capacitor that sample and hold information corresponding to charges integrated in the LCG capacitor. For example, the first reset capacitor and the first signal capacitor, and the second reset capacitor and the second signal capacitor, may correspond to an output node (hereinafter referred to as "NO").

During one global signal dump period GSDP, the image sensor 100 according to some example embodiments of the present inventive concepts may support a dual conversion gain (hereinafter referred to as 'DCG') mode in which each pixel PX operates in an HCG mode and an LCG mode.

For example, in the HCG mode in the global signal dump period GSDP, reset-level information and signal-level information corresponding to the HCG capacitor at the side of the floating diffusion node FD may be sampled and held in the first reset capacitor and the first signal capacitor at the side of the output node NO. Moreover, in the LCG mode in the global signal dump period GSDP, reset-level information and signal-level information corresponding to the LCG capacitor at the side of the floating diffusion node FD may be sampled and held in the second reset capacitor and the second signal capacitor at the side of the output node NO.

Afterward, during a read-out period (hereinafter referred to as 'ROP'), information held in the first reset capacitor and information held in the first signal capacitor at the side of the output node NO may be output as an HCG reset signal and an HCG image signal, respectively. Furthermore, information held in the second reset capacitor and information held in the second signal capacitor at the side of the output node NO may be output as an LCG reset signal and an LCG image signal, respectively.

As such, during the one global signal dump period GSDP, the image sensor 100 according to some example embodiments of the present inventive concepts may have HDR by supporting a dual conversion gain (DCG) mode operating in the HCG mode and the LCG mode.

Continuing to refer to FIG. 1, under control of the timing controller 140, the row driver 120 may generate control signals for controlling the pixel array 110 and may provide control signals to the plurality of pixels PX. For example, to operate in a global shutter mode, the row driver 120 may determine the activation and deactivation timings of the control signals for the plurality of pixels PX. For example, the row driver 120 may activate the control signals in a particular (or, alternatively, predetermined) order such that the pixel array 110 is capable of being controlled for each row. Afterward, a reset signal and an image signal generated from each of the pixels PX of the selected row may be transmitted to the read-out circuit 130.

The read-out circuit 130 may receive a reset signal and an image signal from the pixel array 110. For example, when the image sensor 100 operates in the DCG mode, the read-out circuit 130 may receive an HCG reset signal and an HCG image signal from the pixel array 110 and may output image data ID in the HCG mode by using the HCG reset signal and the HCG image signal. When the image sensor 100 operates in the DCG mode, the read-out circuit 130 may receive an LCG reset signal and an LCG image signal from the pixel array 110 and may output the image data ID in the LCG mode by using the LCG reset signal and the LCG image signal. The read-out circuit 130 may include a correlated double sampling circuit 131, an analog-to-digital converter 132, and a buffer 133.

The correlated double sampling circuit 131 may sample and hold a pixel signal provided by the pixel array 110. For example, when the image sensor 100 operates in the DCG mode, the correlated double sampling circuit 131 may output (e.g., transmit) a level (e.g., signal level, signal having a particular magnitude such as a voltage level or magnitude, etc.) corresponding to a difference obtained by performing double sampling on the HCG reset signal and the HCG image signal, and may output a level corresponding to a difference obtained by performing double sampling on the LCG reset signal and the LCG image signal.

The analog-to-digital converter 132 may convert an analog signal corresponding to a level received from the correlated double sampling circuit 131 into a digital signal.

The buffer 133 may latch the digital signal and may sequentially output the latched image data ID.

The timing controller 140 may control the pixel array 110, the row driver 120, the read-out circuit 130, and the like. To perform operations of the pixel array 110, the row driver 120, the read-out circuit 130, and the like, the timing controller 140 may supply control signals, such as clock signals and timing control signals. The timing controller 140 may include a logic control circuit, a phase locked loop (PLL) circuit, a timing control circuit, a communication interface circuit, and the like.

The configuration of the image sensor 100 according to some example embodiments of the present inventive concepts is briefly described above. According to some example embodiments of the present inventive concepts, the image sensor 100 may operate in a DCG mode in the global signal dump period GSDP of a global shutter mode. The image sensor 100 may sample and hold information in the HCG mode in the first reset capacitor and the first signal capacitor and may sample and hold information in the LCG mode in the second reset capacitor and the second signal capacitor. Accordingly, the HDR may be implemented and a high-quality image may be generated.

Figure 2:
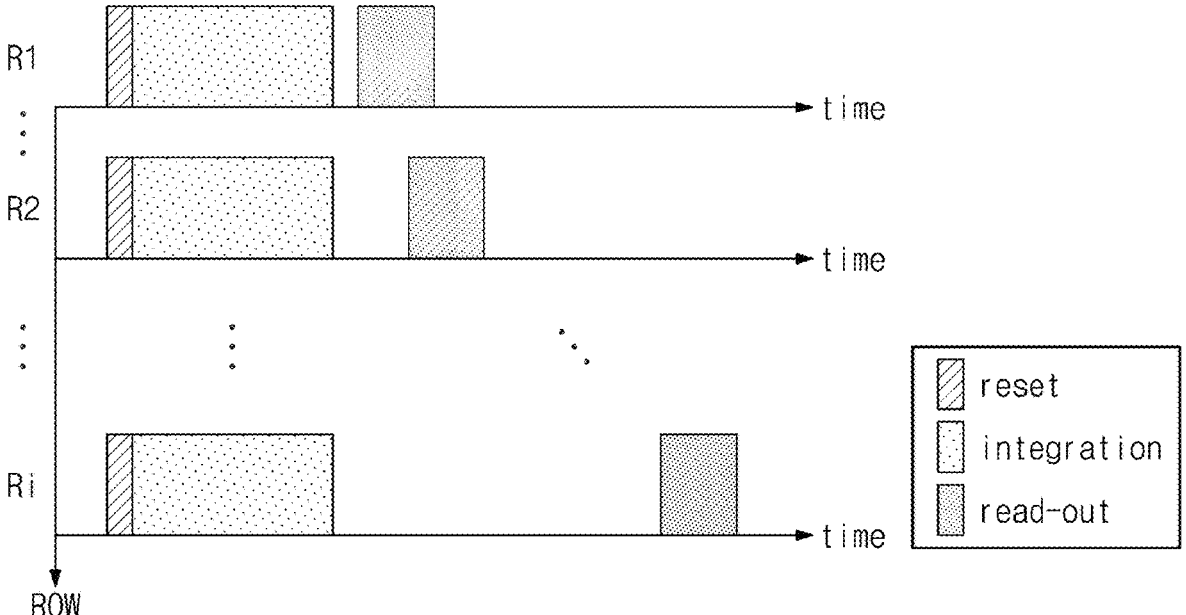
FIG. 2 is a diagram for describing an operation of a global shutter mode of an image sensor, according to some example embodiments of the present inventive concepts.

FIG. 2 is a diagram for describing an operation of a global shutter mode of the image sensor 100, according to some example embodiments of the present inventive concepts.

Referring to FIGS. 1 and 2, the image sensor 100 may operate in a global shutter mode. In the global shutter mode, the image sensor 100 may perform a global signal dumping operation performed during a global signal dump period GSDP and a read-out operation performed during a read-out period ROP. The global signal dumping operation may include a reset operation of resetting charges integrated in a floating diffusion node and an integration operation of integrating photocharges generated by a photoelectric conversion element.

During the global signal dump period GSDP, a reset time, which is a time at which a reset operation is performed on different rows (e.g., first to i-th rows R1 to Ri, where "i" is any integer) may be the same as a charge integration time at which an integration operation is performed, under control of the image sensor 100. The integration time may mean a time for integrating or substantially integrating photocharges generated by a photoelectric conversion element (e.g., a photodiode) included in each of the plurality of pixels PX.

During the read-out period ROP, a rolling read-out operation, in which read-out operations are sequentially performed for each row, may be performed. For example, during the read-out period ROP, a read-out operation may be sequentially performed from the first row R1 to the i-th row Ri under control of the image sensor 100. The read-out time may refer to a time during which a pixel signal corresponding to photocharges generated by each of the plurality of pixels PX is output from each of the plurality of pixels PX.

In some example embodiments of the present inventive concepts, the image sensor 100 may operate in the global shutter mode. In particular, during the global signal dump period GSDP, the image sensor 100 according to some example embodiments of the present inventive concepts may operate in an HCG mode and an LCG mode. Accordingly, the HDR may be implemented and a high-quality image may be generated.

Figure 3:
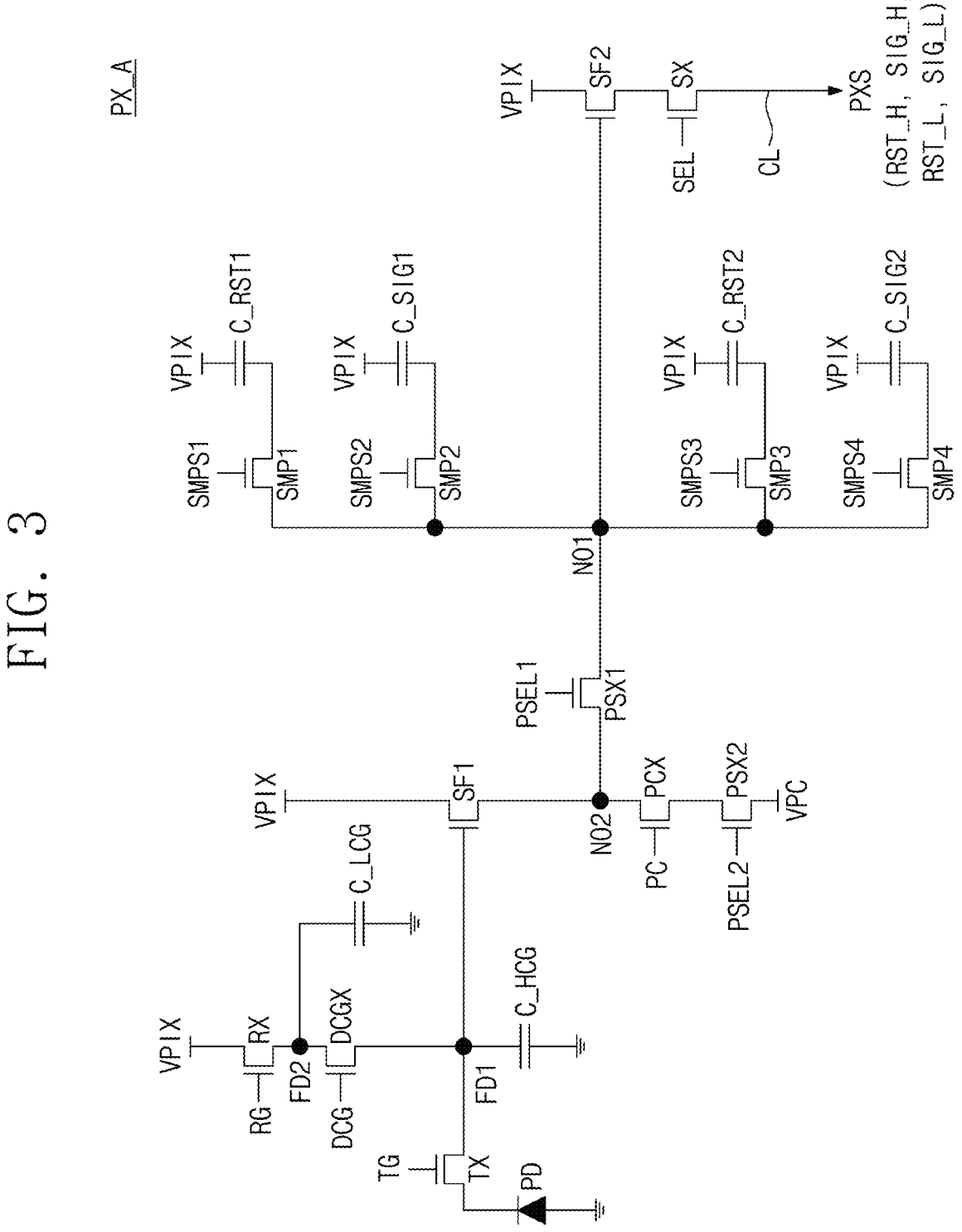
FIG. 3 is a circuit diagram for describing an example of the pixel PX of FIG. 1 according to some example embodiments of the present inventive concepts.

FIG. 3 is a circuit diagram for describing an example of the pixel PX of FIG. 1 according to some example embodiments of the present inventive concepts.

Referring to FIG. 3, the pixel PX, referred to interchangeably with regard to at least FIG. 3 as a pixel PX_A, may include a photodiode PD, a plurality of transistors TX, RX, and DCGX corresponding to floating diffusion nodes FD1 and FD2, a plurality of transistors PCX, PSX1, PSX2, SMP1, SMP2, SMP3, SMP4, SF2, and SX corresponding to output nodes NO1 and NO2, and a plurality of capacitors C_HCG, C_LCG, C_RST1, C_SIG1, C_RST2, and C_SIG2. Some of the plurality of capacitors may be implemented as parasitic capacitors.

The photodiode PD may generate photocharges (also referred to herein interchangeably as one or more charges) that vary depending on the intensity of light. For example, the photodiode PD may generate charges proportional to the intensity of incident light. The photodiode PD may be an example of a photoelectric conversion element and may be at least one of a photo transistor, a photo gate, a pinned photodiode (PPD), or any combination thereof.

The first floating diffusion node FD1 may be configured to store the charge generated by the photodiode PD. The transfer transistor TX may be positioned between the photodiode PD and the first floating diffusion node FD1. For example, one end of the transfer transistor TX may be connected to the photodiode PD, and the other end of the transfer transistor TX may be connected to the first floating diffusion node FD1. The transfer transistor TX may be turned on or off in response to a transfer control signal TG received from the row driver 120 and may transmit charges generated by the photodiode PD to the first floating diffusion node FD1. The first floating diffusion node FD1 may be connected to the HCG capacitor C_HCG, and the charges generated by the photodiode PD may be integrated in the HCG capacitor C_HCG.

The reset transistor RX may be positioned between a pixel voltage terminal VPIX and the second floating diffusion node FD2. For example, one end of the reset transistor RX may be connected to the pixel voltage terminal VPIX, and the other end of the reset transistor RX may be connected to the second floating diffusion node FD2. The reset transistor RX may be turned on or off in response to a reset control signal RG received from the row driver 120.

The reset transistor RX may reset a voltage level of the first floating diffusion node FD1 and/or the second floating diffusion node FD2. For example, while the dual conversion gain transistor DCGX is turned on, the reset transistor RX may be turned on. In this case, the pixel voltage terminal VPIX may be connected to the HCG capacitor C_HCG connected to the first floating diffusion node FD1, and charges integrated in the HCG capacitor C_HCG may be drained to the pixel voltage terminal VPIX. Accordingly, the voltage level of the first floating diffusion node FD1 may be reset.

As in the above description, while the dual conversion gain transistor DCGX is turned on or off, the reset transistor RX may be turned on. In this case, the pixel voltage terminal VPIX may be connected to the LCG capacitor C_LCG connected to the second floating diffusion node FD2, and charges integrated in the LCG capacitor C_LCG may be drained to the pixel voltage terminal VPIX. Accordingly, the voltage level of the second floating diffusion node FD2 may be reset.

The dual conversion gain transistor DCGX may be positioned between the first floating diffusion node FD1 and the second floating diffusion node FD2, such that the second floating diffusion node FD2 may be understood to be "spaced from" the first floating diffusion node FD1 (e.g., by at least the dual conversion gain transistor DCGX). The dual conversion gain transistor DCGX may be turned on or off in response to a dual conversion control signal DCG received from the row driver 120 and may electrically connect or disconnect the first floating diffusion node FD1 and the second floating diffusion node FD2. For example, the dual conversion gain transistor DCGX may be configured to selectively connect the second floating diffusion node FD2 to the first floating diffusion node FD1 based on the dual conversion gain transistor DCGX being turned on or off. Accordingly, the second floating diffusion node FD2 may be configured to be selectively connected to the first floating diffusion node FD1 and may be configured to store the charge generated by the photodiode PD (e.g., based on the second floating diffusion node FD2 may be selectively connected to the first floating diffusion node FD1 according to operation of the dual conversion gain transistor DCGX).

It will be understood that, where a transistor is described to electrically connect or disconnect one element (e.g., a node, a capacitor, or the like) and another element (e.g., another node, another capacitor, or the like), also referred to here as a first element and a second element, the transistor will be understood to be configured to selectively connect (also referred to herein interchangeably as being configured to selectively electrically connect) the first element and the second element, and each element of the first element and the second element will be understood to be selectively connected (also referred to herein interchangeably as selectively electrically connected) to the other element of the first element and the second element. It will further be understood that any element described herein as being "selectively connected" to another element may be interchangeably referred to as being configured to be selectively connected to the other element (e.g., by a transistor that is connected between the element and the other element). It will also be understood that elements described herein to be "positioned between" at least two other elements may be interchangeably referred to as being "connected between" or "electrically connected between" the at least two other elements.

In some example embodiments, in the HCG mode, the dual conversion gain transistor DCGX may be turned off. In this case, the first floating diffusion node FD1 may be electrically isolated (e.g., electrically disconnected) from the second floating diffusion node FD2, and thus charges generated by the photodiode PD may be integrated on only the HCG capacitor C_HCG. Accordingly, where elements of the pixel PX_A are described herein to be configured to perform certain operations (e.g., store a charge) in the HCG mode, such elements may be understood to be configured to perform such operations based on the pixel PX_A being in the HCG mode, for example based on the first floating diffusion node FD1 being electrically disconnected from the second floating diffusion node FD2, for example based on the conversion gain transistor DCGX being turned off. For example, where elements of the pixel PX_A are described herein to be configured to perform certain operations "in a state" where the first floating diffusion node FD1 is electrically disconnected from the second floating diffusion node FD2, it will be understood that such elements may be configured to perform the certain operations based on (e.g., at least partially in response to) the first floating diffusion node FD1 being electrically disconnected from the second floating diffusion node FD2, for example based on the conversion gain transistor DCGX being turned off (e.g., based on the pixel PX_A being in the HCG mode).

In some example embodiments, in the LCG mode, the dual conversion gain transistor DCGX may be turned on. In this case, the first floating diffusion node FD1 may be electrically connected to the second floating diffusion node FD2, and thus the capacities of the floating diffusion nodes FD1 and FD2 may increase to the sum of the capacity of the HCG capacitor C_HCG and the capacity of the LCG capacitor C_LCG. Accordingly, even when the light intensity is strong, charges generated by the photodiode PD may be sufficiently accommodated by the HCG capacitor C_HCG and the LCG capacitor C_LCG. Accordingly, where elements of the pixel PX_A are described herein to be configured to perform certain operations (e.g., store a charge) in the LCG mode, such elements may be understood to be configured to perform such operations based on the pixel PX_A being in the LCG mode, for example based on the first floating diffusion node FD1 being electrically connected to the second floating diffusion node FD2, for example based on the conversion gain transistor DCGX being turned on.

For example, where elements of the pixel PX_A are described herein to be configured to perform certain operations "in a state" where the first floating diffusion node FD1 is electrically connected to the second floating diffusion node FD2, it will be understood that such elements may be configured to perform the certain operations based on (e.g., at least partially in response to) the first floating diffusion node FD1 being electrically connected to the second floating diffusion node FD2, for example based on the conversion gain transistor DCGX being turned on (e.g., based on the pixel PX_A being in the LCG mode). It will be understood that a capacity of a capacitor as described herein may be referred to interchangeably as a capacitance of the capacitor.

The HCG capacitor C_HCG may be connected to the first floating diffusion node FD1. The HCG capacitor C_HCG may be defined by using, for example, parasitic capacitance. However, this is only an example, and the HCG capacitor C_HCG may be implemented by using separate conductive electrodes.

The LCG capacitor C_LCG may be connected to the second floating diffusion node FD2. The LCG capacitor C_LCG may have a larger capacity than the HCG capacitor C_HCG. For example, the LCG capacitor C_LCG may be implemented by using separate conductive electrodes. However, this is only an example, and the LCG capacitor C_LCG may be defined by using parasitic capacitance.

The voltage levels of the floating diffusion nodes FD1 and FD2 may be determined depending on the amount of charge integrated in the HCG capacitor C_HCG and/or the LCG capacitor C_LCG. That is, the amount of charge stored in a capacitor connected to the floating diffusion node FD may be converted into voltage. The conversion gain may be determined by the capacitance of the floating diffusion node FD and may be inversely proportional to the magnitude of the capacitance. When the capacitance of the floating diffusion node FD increases, the conversion gain decreases. When the capacitance of the floating diffusion node FD decreases, the conversion gain increases.

In some example embodiments, in the HCG mode, the dual conversion gain transistor DCGX is turned off, and charges generated by the photodiode PD may be delivered to the first floating diffusion node FD1. In this case, the voltage level of the first floating diffusion node FD1 may be determined depending on the amount of charge integrated in the HCG capacitor C_HCG.

In some example embodiments, in the LCG mode, the dual conversion gain transistor DCGX is turned on, and charges generated by the photodiode PD may be delivered to the first and second floating diffusion nodes FD1 and FD2. In this case, voltage levels of the first and second floating diffusion nodes FD1 and FD2 may be determined depending on the amount of charge integrated in the HCG capacitor C_HCG and the LCG capacitor C_LCG.

Continuing to refer to FIG. 3, a first source follower SF1 may be positioned between the pixel voltage terminal VPIX and the second output node NO2. For example, one end of the first source follower SF1 may be connected to the pixel voltage terminal VPIX, and the other end of the first source follower SF1 may be connected to the second output node NO2.

The first source follower SF1 may be a buffer amplifier and may buffer information according to voltage levels of the floating diffusion nodes FD1 and FD2. For example, the voltage level of the floating diffusion node FD changes depending on the amount of charge integrated in the HCG capacitor C_HCG and/or the LCG capacitor C_LCG connected to the floating diffusion nodes FD1 and FD2. As the voltage levels of the floating diffusion nodes FD1 and FD2 change, the first source follower SF1 may amplify a change in a voltage level at the floating diffusion nodes FD1 and FD2 and may output the amplified result to the second output node NO2.

The precharge transistor PCX may be positioned between the second output node NO2 and the second precharge select transistor PSX2. For example, one end of the precharge transistor PCX may be connected to the second output node NO2, and the other end of the precharge transistor PCX may be connected to the second precharge select transistor PSX2. The precharge transistor PCX may operate as a current source depending on a precharge control signal PC received from the row driver 120.

The first precharge select transistor PSX1 may be positioned between the first output node NO1 and the second output node NO2. The first precharge select transistor PSX1 may be turned on or off in response to a first precharge select control signal PSEL1 received from the row driver 120. The first precharge select transistor PSX1 may be used to precharge the first output node NO1.

In some example embodiments, while the second precharge select transistor PSX2 and the precharge transistor PCX are turned on, the first precharge select transistor PSX1 may be turned on. Accordingly, the output nodes NO1 and NO2 may be electrically connected to a precharge voltage terminal VPC. Accordingly, the output nodes NO1 and NO2 may be precharged, and noise caused by charges remaining in the output nodes NO1 and NO2 may be removed.

In some example embodiments, while the floating diffusion nodes FD1 and FD2 are electrically connected to the pixel voltage terminal VPIX (e.g., based on the dual conversion gain transistor DCGX being turned on), the first precharge select transistor PSX1 may be turned on. In this case, voltage levels of the floating diffusion nodes FD1 and FD2, which are reset levels, may be delivered to the output nodes NO1 and NO2 through the first source follower SF1 and the first precharge select transistor PSX1. Accordingly, voltages at the output nodes NO1 and NO2 may be reset to a pixel voltage, and the noise caused by charges remaining at the first output node NO1 may be stably removed.

As such, a change in a voltage level due to charges remaining at the output nodes NO1 and NO2 or unintentional charge injection may be reduced, minimized or prevented by precharging or resetting the output nodes NO1 and NO2 through the first precharge select transistor PSX1. In particular, a separate reset transistor or clear transistor may not be required to remove charges remaining at the output nodes NO1 and NO2 by resetting the output nodes NO1 and NO2 by using voltage levels of the floating diffusion nodes FD1 and FD2, which are reset levels. As a result, an area required to implement the pixel PX according to some example embodiments of the present inventive concepts may be reduced, thereby improving compactness of the pixel PX and further improving compactness of the pixel array 110 and thus of the image sensor 100 and any device including same.

The second precharge select transistor PSX2 may be positioned between the precharge transistor PCX and the precharge voltage terminal VPC. For example, one end of the second precharge select transistor PSX2 may be connected to the precharge transistor PCX, and the other end of the second precharge select transistor PSX2 may be connected to the precharge voltage terminal VPC. The precharge voltage may be, for example, a ground voltage GND. However, this is only an example. The precharge voltage may be a voltage higher than a power supply voltage, for example, a power supply voltage VDD. The second precharge select transistor PSX2 may be turned on or off in response to a second precharge select control signal PSEL2 received from the row driver 120. The second precharge select transistor PSX2 may be used to precharge the second output node NO2.

In some example embodiments, while the precharge transistor PCX is turned on, the second precharge select transistor PSX2 may be turned on. Accordingly, the second output node NO2 may be electrically connected to the precharge terminal VPC, and thus the second output node NO2 may be precharged. When the second output node NO2 is precharged with only the precharge transistor PCX without the second precharge select transistor PSX2, the precharge transistor PCX may need to be manufactured in a relatively large size. Accordingly, a relatively large amount of power may consumed when the second output node NO2 is precharged with only the precharge transistor PCX without the second precharge select transistor PSX2. According to some example embodiments of the present inventive concepts, as such, while the precharge transistor PCX is turned on and operates as a current source, the on/off state of the second precharge select transistor PSX2 may be controlled. Compared to a case of recharging the second output node NO2 with only the precharge transistor PCX, relatively little power may be consumed based on including the second precharge select transistor PSX2 connected between the precharge transistor PCX and the precharge terminal VPC, thereby reducing power consumption and thus improving power consumption efficiency of the pixel PX and further improving power consumption efficiency of the pixel array 110 and thus of the image sensor 100 and any device including same.

The first sampling transistor SMP1 may be positioned between the first output node NO1 and the first reset capacitor C_RST1. The first sampling transistor SMP1 may be turned on or off in response to a first sampling control signal SMPS1 received from the row driver 120, and may electrically connect or disconnect the first reset capacitor C_RST1 and the first output node NO1.

The first reset capacitor C_RST1 may be positioned between the first sampling transistor SMP1 and the pixel voltage terminal VPIX. For example, one end of the first reset capacitor C_RST1 may be connected to the pixel voltage terminal VPIX, and the other end of the first reset capacitor C_RST1 may be connected to the first sampling transistor SMP1.

Charges may be integrated in the first reset capacitor C_RST1 depending on a switching operation of the first sampling transistor SMP1. For example, in the HCG mode, the voltage level of the floating diffusion node FD1 may be reset. In this case, charges corresponding to information of a reset level of the floating diffusion node FD1 (e.g., a charge corresponding to at least a first reset voltage level of the first floating diffusion node FD1) may be integrated (e.g., stored) in the first reset capacitor C_RST1.

The second sampling transistor SMP2 may be positioned between the first output node NO1 and the first signal capacitor C_SIG1. The second sampling transistor SMP2 may be turned on or off in response to a second sampling control signal SMPS2 received from the row driver 120, and may electrically connect or disconnect the first signal capacitor C_SIC1 and the first output node NO1.

The first signal capacitor C_SIG1 may be positioned between the second sampling transistor SMP2 and the pixel voltage terminal VPIX. For example, one end of the first signal capacitor C_SIG1 may be connected to the pixel voltage terminal VPIX, and the other end of the first signal capacitor C_SIG1 may be connected to the second sampling transistor SMP2.

Charges may be integrated in the first signal capacitor C_SIG1 depending on a switching operation of the second sampling transistor SMP2. For example, in the HCG mode, charges generated by the photodiode PD may be integrated in the HCG capacitor C_HCG of the floating diffusion node FD1. In this case, charges corresponding to information of a signal level of the floating diffusion node FD1 (e.g., a charge corresponding to at least a first signal voltage level of the first floating diffusion node FD1) may be integrated (e.g., stored) in the first signal capacitor C_SIG1.

The third sampling transistor SMP3 may be positioned between the first output node NO1 and the second reset capacitor C_RST2. The third sampling transistor SMP3 may be turned on or off in response to a third sampling control signal SMPS3 received from the row driver 120, and may electrically connect or disconnect the second reset capacitor C_RST2 and the first output node NO1.

The second reset capacitor C_RST2 may be positioned between the third sampling transistor SMP3 and the pixel voltage terminal VPIX. For example, one end of the second reset capacitor C_RST2 may be connected to the pixel voltage terminal VPIX, and the other end of the second reset capacitor C_RST2 may be connected to the third sampling transistor SMP3.

Charges may be integrated in the second reset capacitor C_RST2 depending on a switching operation of the third sampling transistor SMP3. For example, in the LCG mode, the voltage levels of the first and second floating diffusion nodes FD1 and FD2 may be reset. In this case, charges corresponding to information of reset levels of the first and second floating diffusion nodes FD1 and FD2 (e.g., a charge corresponding to at least a second reset voltage level of the first floating diffusion node FD1) may be integrated (e.g., stored) in the second reset capacitor C_RST2.

The fourth sampling transistor SMP4 may be positioned between the first output node NO1 and the second signal capacitor C_SIG2. The fourth sampling transistor SMP4 may be turned on or off in response to a fourth sampling control signal SMPS4 received from the row driver 120, and may electrically connect or disconnect the second signal capacitor C_SIC2 and the first output node NO1.

The second signal capacitor C_SIG2 may be positioned between the fourth sampling transistor SMP4 and the pixel voltage terminal VPIX. For example, one end of the second signal capacitor C_SIG2 may be connected to the pixel voltage terminal VPIX, and the other end of the second signal capacitor C_SIG2 may be connected to the fourth sampling transistor SMP4.

Charges may be integrated in the second signal capacitor C_SIG2 depending on a switching operation of the fourth sampling transistor SMP4. For example, in the LCG mode, charges generated by the photodiode PD may be integrated in the HCG capacitor C_HCG and the LCG capacitor C_LCG of the first and second floating diffusion nodes FD1 and FD2. In this case, charges corresponding to information of signal levels of the first and second floating diffusion nodes FD1 and FD2 (e.g., a charge corresponding to at least a second signal voltage level of the first floating diffusion node FD1) may be integrated (e.g., stored) in the second signal capacitor C_SIG2.

In some example embodiments of the present inventive concepts, capacities of the first reset capacitor C_RST1 and the first signal capacitor C_SIG1 corresponding to the HCG mode may be different from capacities of the second reset capacitor C_RST2 and the second signal capacitor C_SIG2 corresponding to the LCG mode.

For example, in the HCG mode, a change in a voltage level of the floating diffusion node FD1 may be relatively large. Accordingly, to effectively reflect a change in a voltage level of the floating diffusion node FD1 in the HCG mode and to reduce noise, capacities of the first reset capacitor C_RST1 and the first signal capacitor C_SIG1 corresponding to the HCG mode may be relatively large (e.g., larger than the capacities of the second reset capacitor C_RST2 and the second signal capacitor C_SIG2 corresponding to the LCG mode, respectively).

Also, for example, in the LCG mode, a change in voltage levels of the floating diffusion nodes FD1 and FD2 may be relatively small. Accordingly, to effectively reflect a change in voltage levels of the floating diffusion nodes FD1 and FD2 in the LCG mode and to be manufactured with a small area, capacities of the second reset capacitor C_RST2 and the second signal capacitor C_SIG2 corresponding to the LCG mode may be relatively small.

However, this is only an example. According to some example embodiments, capacities of the first reset capacitor C_RST1 and the first signal capacitor C_SIG1 corresponding to the HCG mode may be the same as capacities of the second reset capacitor C_RST2 and the second signal capacitor C_SIG2 corresponding to the LCG mode.

The second source follower SF2 may be positioned between the pixel voltage terminal VPIX and the select transistor SX. For example, one end of the second source follower SF2 may be connected to the pixel voltage terminal VPIX, and the other end of the second source follower SF2 may be connected to the select transistor SX. The second source follower SF2 may amplify and output a change in a voltage level at the first output node NO1.

One end of the select transistor SX may be connected to the second source follower SF2, and the other end of the select transistor SX may be connected to a column line CL. The column line CL may be one of column lines CLs of FIG. 1.

The select transistor SX may be turned on or off in response to a select control signal SEL received from the row driver 120. When the select transistor SX is turned on, a pixel signal PXS according to a change in a voltage level at the first output node NO1 may be output to the column line CL.

For example, an HCG reset signal RST_H may be output as the pixel signal PXS, and the HCG reset signal RST_H may be a pixel signal corresponding to charges integrated in the first reset capacitor C_RST1. Moreover, an HCG image signal SIG_H may be output as the pixel signal PXS, and the HCG image signal SIG_H may be a pixel signal corresponding to charges integrated in the first signal capacitor C_SIG1. The image data ID suitable for an environment where the intensity of light is weak may be generated by using the HCG reset signal RST_H and the HCG image signal SIG_H.

As in the above description, a LCG reset signal RST_L or a LCG image signal SIG_L may be output as the pixel signal PXS. The LCG reset signal RST_L may be a pixel signal corresponding to charges integrated in the second reset capacitor C_RST2. The LCG image signal SIG_L may be a pixel signal corresponding to charges integrated in the second signal capacitor C_SIG2. The image data ID suitable for an environment where the intensity of light is strong may be generated by using the LCG reset signal RST_L and the LCG image signal SIG_L. Afterward, high-quality image data may be generated by synthesizing image data suitable for an environment where the intensity of light is weak, and image data suitable for an environment where the intensity of light is strong.

The configuration of the pixel PX according to some example embodiments of the present inventive concepts is briefly described above. According to some example embodiments of the present inventive concepts, the pixel PX may include the HCG capacitor C_HCG and the LCG capacitor C_LCG, which are disposed at the side of the floating diffusion node FD. The pixel PX may include the first reset capacitor C_RST1, the first signal capacitor C_SIG1, the second reset capacitor C_RST2, and the second signal capacitor C_SIG2, which are disposed at the side of the output node NO (e.g., the first output node NO1). Moreover, a voltage level of the floating diffusion node FD1 in the HCG mode may be sampled and held in the first reset capacitor C_RST1 and the first signal capacitor C_SIG1, and voltage levels of the floating diffusion nodes FD1 and FD2 in the LCG mode may be sampled and held in the second reset capacitor C_RST2 and the second signal capacitor C_SIG2. Accordingly, the HDR may be implemented and a high-quality image may be generated.

Figure 4A:
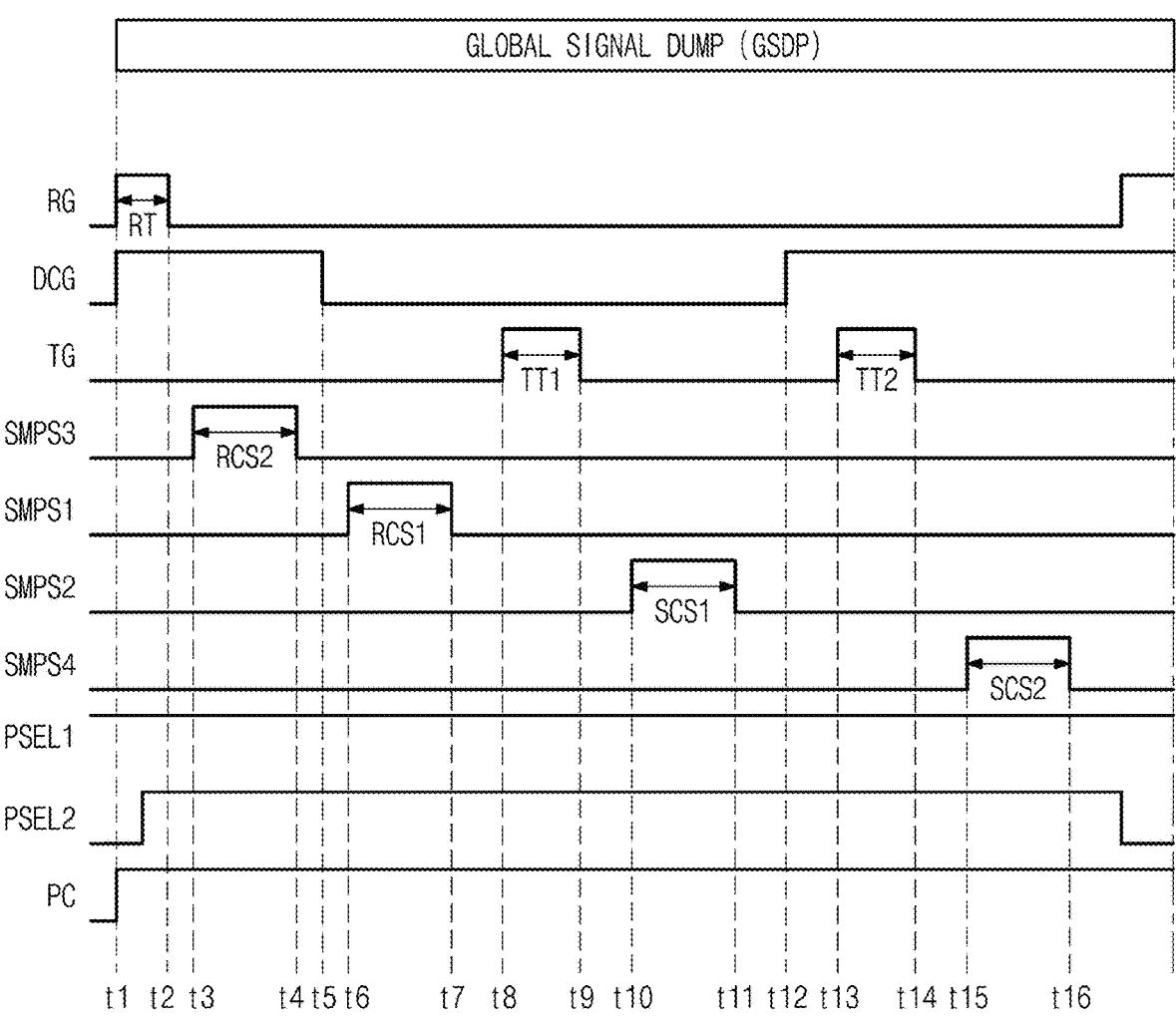
FIG. 4A is a timing diagram showing an example of control signals provided to the pixel PX in the global signal dump period GSDP according to some example embodiments of the present inventive concepts.

FIGS. 4A to 6F are diagrams for describing an example of an operation of the pixel PX of FIG. 3. In detail, FIG. 4A is a timing diagram showing an example of control signals provided to the pixel PX in the global signal dump period GSDP according to some example embodiments of the present inventive concepts. FIG. 4B is a timing diagram showing an example of control signals provided to the pixel PX in the read-out period ROP according to some example embodiments of the present inventive concepts. FIGS. 5A, 5B, 5C, and 5D are diagrams showing an example of an operation of the pixel PX in the global signal dump period GSDP of FIG. 4A according to some example embodiments of the present inventive concepts. FIGS. 6A, 6B, 6C, 6D, 6E, and 6F are diagrams illustrating an example of an operation of the pixel PX in the read-out period ROP of FIG. 4B according to some example embodiments of the present inventive concepts. It will be understood that an image sensor (e.g., image sensor 100 shown in FIG. 1) may be configured to operate in order to operate and/or control one or more pixels PX (e.g., the pixel PX_A shown in FIG. 3) as shown in FIGS. 4A to 6F, for example based on causing one or more control signals to be provided to the pixel as shown in FIGS. 4A to 6F. For example, the image sensor may be configured to operate such that one or more of the operations described with reference to FIGS. 4A to 6F occur.

First of all, referring to FIG. 4A, from time t1 to time t2, both the reset control signal RG and the dual conversion control signal DCG may be at high levels. Accordingly, the reset transistor RX and the dual conversion gain transistor DCGX may be turned on, and both the first floating diffusion node FD1 and the second floating diffusion node FD2 may be connected to the pixel voltage terminal VPIX. Accordingly, voltage levels of the first and second floating diffusion nodes FD1 and FD2 may be reset. At this time, each of the voltage levels of the first and second floating diffusion nodes FD1 and FD2 may be referred to as a "reset level". In addition, a period from time t1 to time t2 may be referred to as a "reset time" (hereinafter referred to as "RT").

From time t2 to time t3, the reset control signal RG may be at a low level and the dual conversion control signal DCG may be at a high level. Accordingly, the reset transistor RX may be turned off, and the dual conversion gain transistor DCGX may be maintained as being turned on. Accordingly, the first floating diffusion node FD1 and the second floating diffusion node FD2 may be electrically connected to each other. The capacities of the first and second floating diffusion nodes FD1 and FD2 may correspond to the sum of the capacity of the HCG capacitor C_HCG and the capacity of the LCG capacitor C_LCG. Moreover, voltage levels of the first and second floating diffusion nodes FD1 and FD2 may be reset levels and may correspond to the amount of charge remaining in the HCG capacitor C_HCG and the LCG capacitor C_LCG.

Furthermore, from time t2 to time t3, the first precharge select control signal PSEL1 may be at a high level. Accordingly, the first precharge select transistor PSX1 may be turned on, and the first output node NO1 and the second output node NO2 may be electrically connected to each other. Accordingly, the voltage levels of the first and second floating diffusion nodes FD1 and FD2, which are reset levels, may be delivered to the first output node NO1 through the first source follower SF1.

Figure 5A:
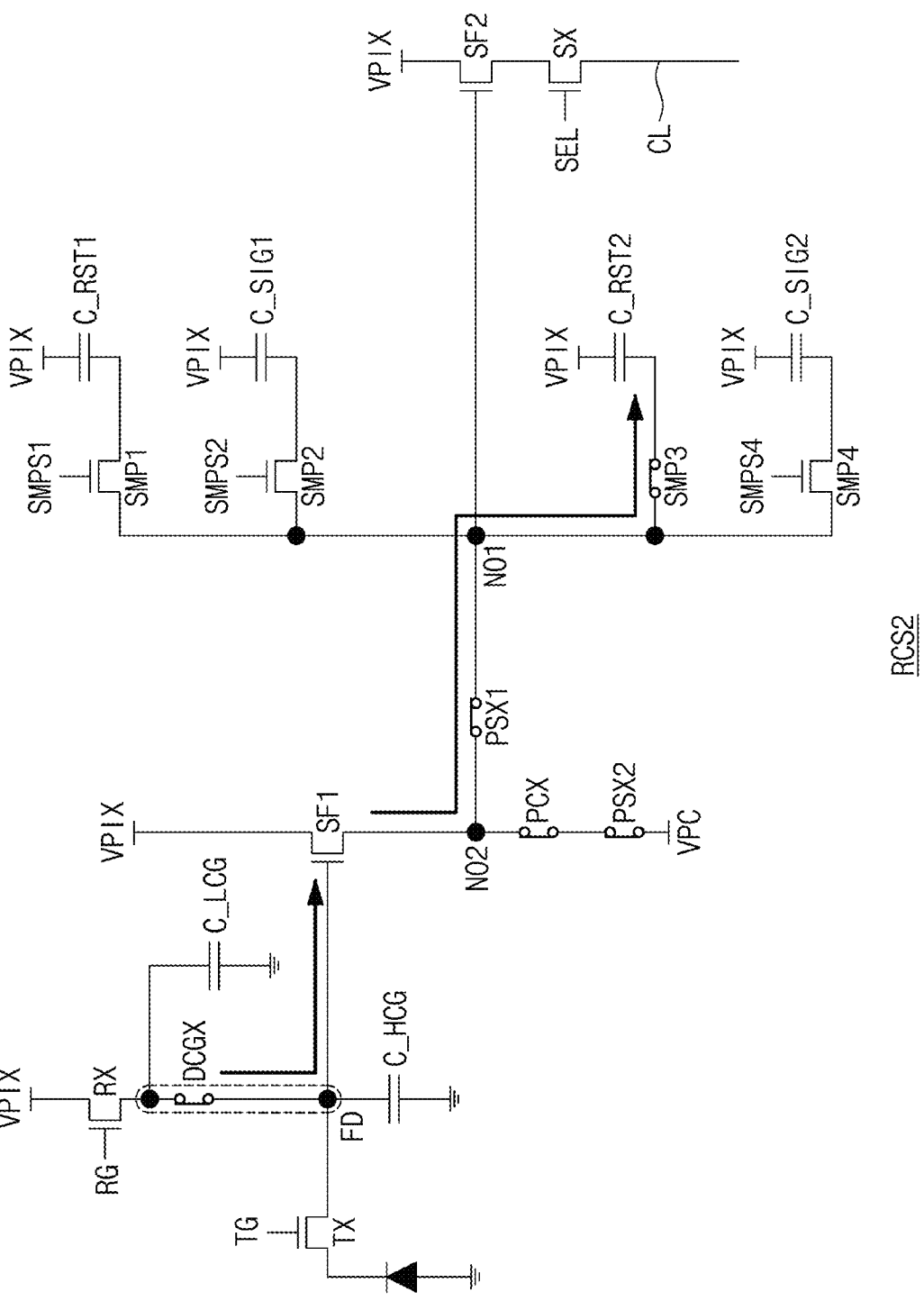

From time t3 to time t4, the third sampling control signal SMPS3 may be at a high level. Accordingly, the third sampling transistor SMP3 may be turned on, and thus the first output node NO1 and the second reset capacitor C_RST2 may be electrically connected to each other. As a result, as illustrated in FIG. 5A, voltage levels of the first and second floating diffusion nodes FD1 and FD2, which are reset levels, may be sampled in the second reset capacitor C_RST2. At this time, voltage levels of the first and second floating diffusion nodes FD1 and FD2, which are reset levels, may correspond to the amount of charge remaining in the HCG capacitor C_HCG and the LCG capacitor C_LCG in the reset state. A period from time t3 to time t4 may be referred to as "LCG mode reset settling time" (hereinafter referred to as "LCG RCS") or second reset settling time (hereinafter referred to as "RCS2").

At time t5, the dual conversion control signal DCG may transition from a high level to a low level. Accordingly, the dual conversion gain transistor DCGX may be turned off, and thus the first floating diffusion node FD1 may be electrically separated (e.g., electrically disconnected) from the second floating diffusion node FD2. Accordingly, the capacity of the first floating diffusion node FD1 may correspond to the capacity of the HCG capacitor C_HCG. The voltage level of the first floating diffusion node FD1 may be a reset level and may correspond to the amount of charge remaining in the HCG capacitor C_HCG.

Figure 5B:
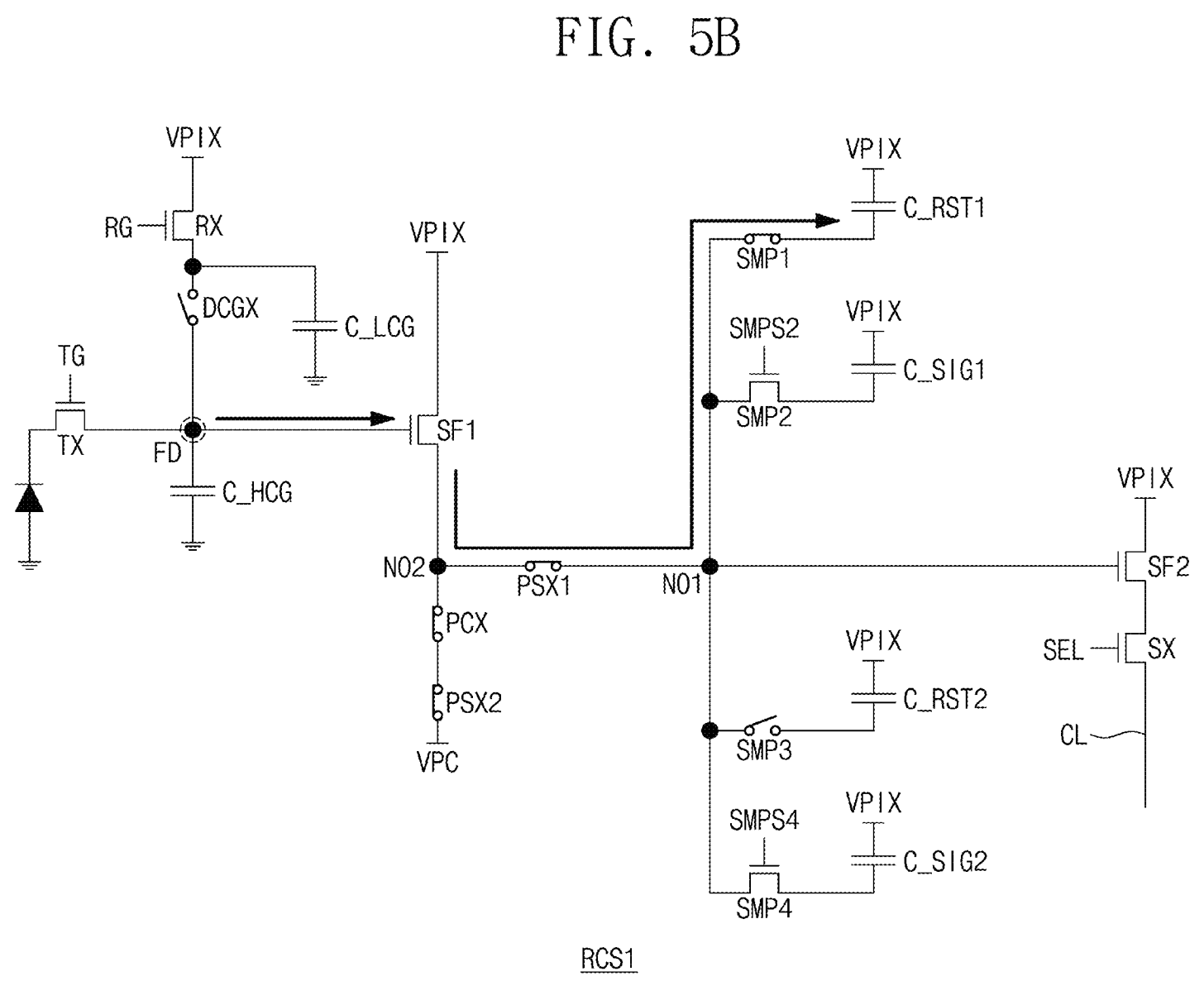

From time t6 to time t7, the first sampling control signal SMPS1 may be at a high level. Accordingly, the first sampling transistor SMP1 may be turned on, and thus the first output node NO1 may be electrically connected to the first reset capacitor C_RST1. As a result, as illustrated in FIG. 5B, a voltage level of the first floating diffusion node FD1, which is a reset level, may be sampled in the first reset capacitor C_RST1. At this time, a voltage level of the first floating diffusion node FD1, which is a reset level, may correspond to the amount of charge remaining in the HCG capacitor C_HCG in the reset state. A period from time t6 to time t7 may be referred to as "HCG mode reset settling time" (hereinafter referred to as "HCG RCS") or first reset settling time (hereinafter referred to as "RCS1").

From time t8 to time t9, the transfer control signal TG may be at a high level. Accordingly, the transfer transistor TX may be turned on. In this case, because the dual conversion gain transistor DCGX is turned off, charges generated by the photodiode PD may be integrated in the HCG capacitor C_HCG of the first floating diffusion node FD1. The voltage level of the first floating diffusion node FD1 may be a signal level and may correspond to the amount of charge integrated in the HCG capacitor C_HCG. A period from time t8 to time t9 may be referred to as a "first integration time TT1".

Furthermore, from time t8 to time t9, the first precharge select control signal PSEL1 may be at a high level. Accordingly, the first precharge select transistor PSX1 may be turned on, and the first output node NO1 and the second output node NO2 may be electrically connected to each other. Accordingly, the voltage level of the first floating diffusion node FD1, which is a reset level, may be delivered to the first output node NO1 through the first source follower SF1.

Figure 5C:
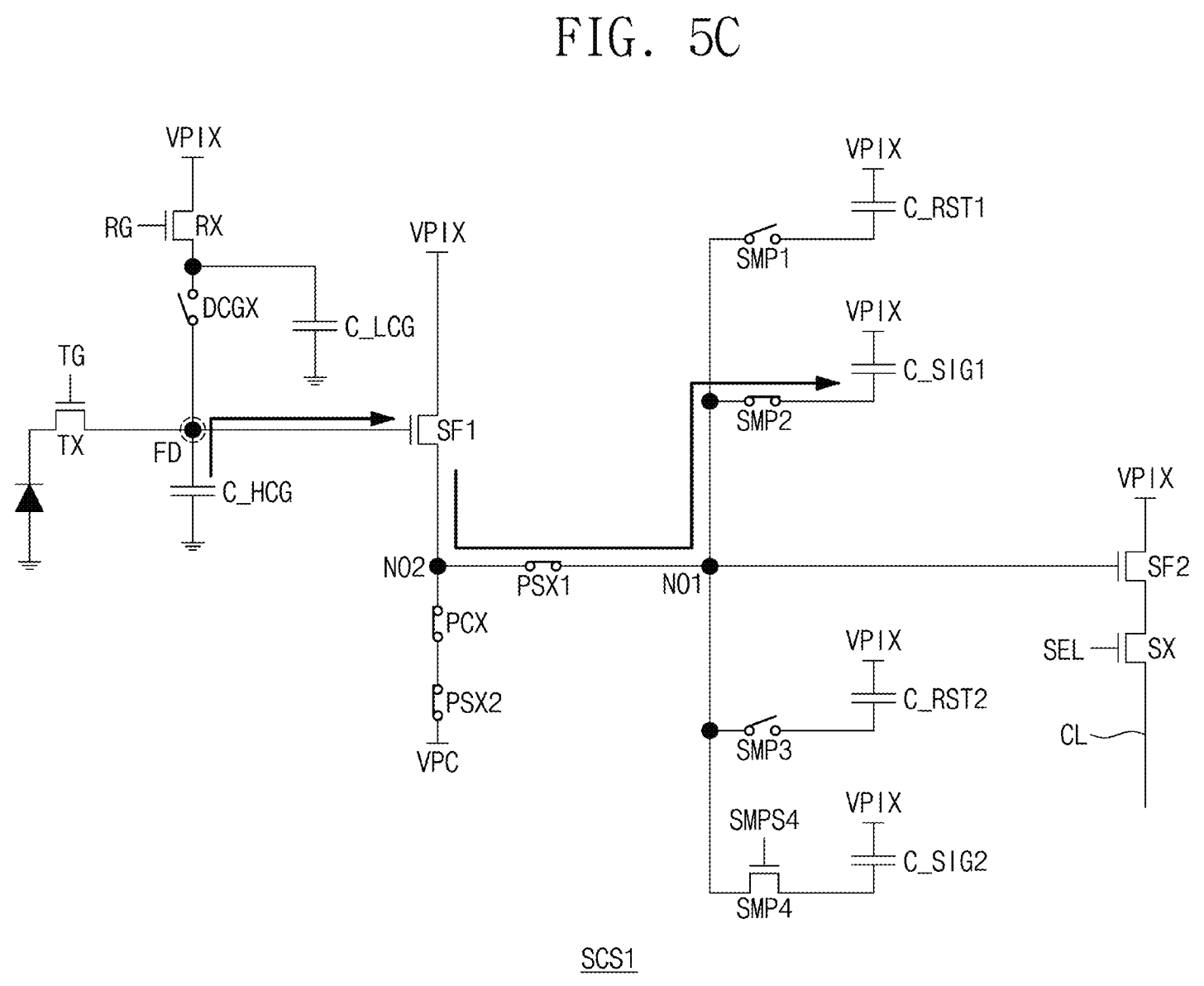

From time t10 to time t11, the second sampling control signal SMPS2 may be at a high level. Accordingly, the second sampling transistor SMP2 may be turned on, and thus the first output node NO1 may be electrically connected to the first signal capacitor C_SIG1. As a result, as illustrated in FIG. 5C, a voltage level of the first floating diffusion node FD1, which is a signal level, may be sampled in the first signal capacitor C_SIG1. In this case, the voltage level of the first floating diffusion node FD1, which is the signal level, may move from the photodiode PD to the HCG capacitor C_HCG and may correspond to the integrated charge amount. A period from time t10 to time t11 may be referred to as "HCG mode signal settling time" (hereinafter referred to as "HCG SCS") or first signal settling time (hereinafter referred to as "SCS1").

At time t12, the dual conversion control signal DCG may transition from a low level to a high level. Accordingly, the dual conversion gain transistor DCGX may be turned on, and thus the first floating diffusion node FD1 may be electrically connected to the second floating diffusion node FD2. Accordingly, the capacities of the first and second floating diffusion nodes FD1 and FD2 may correspond to the sum of the capacity of the HCG capacitor C_HCG and the capacity of the LCG capacitor C_LCG.

From time t13 to time t14, the transfer control signal TG may be at a high level. Accordingly, the transfer transistor TX may be turned on. In this case, because the dual conversion gain transistor DCGX is turned on, charges generated by the photodiode PD may be integrated in the HCG capacitor C_HCG and the LCG capacitor C_LCG of the first and second floating diffusion nodes FD1 and FD2. Voltage levels of the first and second floating diffusion nodes FD1 and FD2 may be signal levels and may correspond to the amount of charge integrated in the HCG capacitor C_HCG and the LCG capacitor C_LCG. A period from time t13 to time t14 may be referred to as a "second integration time TT2".

Furthermore, from time t13 to time t14, the first precharge select control signal PSEL1 may be at a high level. Accordingly, the first precharge select transistor PSX1 may be turned on, and the first output node NO1 and the second output node NO2 may be electrically connected to each other. Accordingly, the voltage levels of the first and second floating diffusion nodes FD1 and FD2, which are signal levels, may be delivered to the first output node NO1 through the first source follower SF1.

Figure 5D:
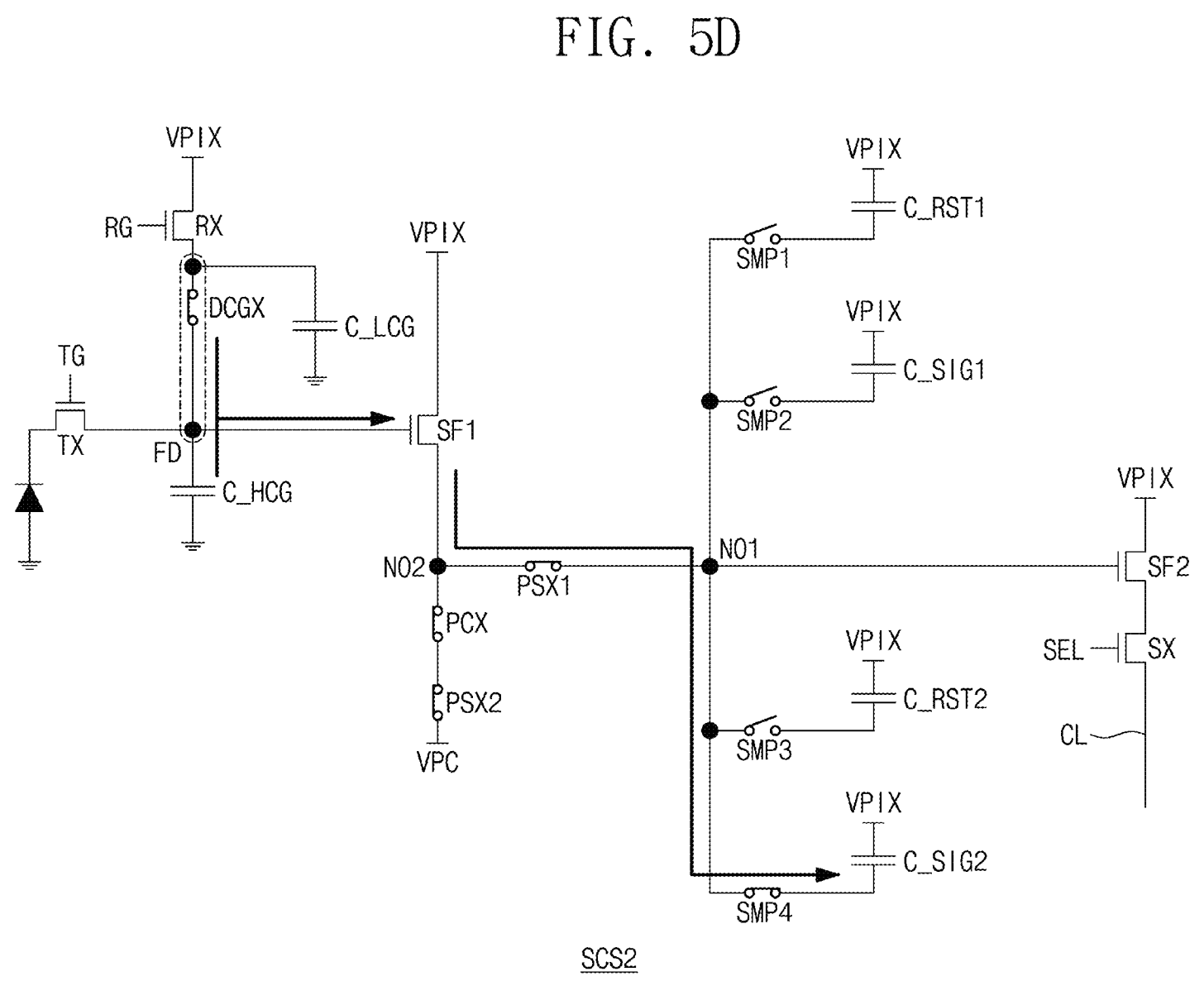

From time t15 to time t16, the fourth sampling control signal SMPS4 may be at a high level. Accordingly, the fourth sampling transistor SMP4 may be turned on, and thus the first output node NO1 may be electrically connected to the second signal capacitor C_SIG2. As a result, as illustrated in FIG. 5D, voltage levels of the first and second floating diffusion nodes FD1 and FD2, which are signal levels, may be sampled in the second signal capacitor C_SIG2. A period from time t15 to time t16 may be referred to as "LCG mode signal settling time" (hereinafter referred to as "LCG SCS") or second signal settling time (hereinafter referred to as "SCS2").

As such, the global signal dump period GSDP may include the first reset settling time RCS1, the second reset settling time RCS2, the first signal settling time SCS1, and the second signal settling time SCS2. The reset level and signal level of the floating diffusion node FD1 in the HCG mode may be sampled and held in the first reset capacitor C_RST1 and the first signal capacitor C_SIG1, respectively. The reset level and signal level of the floating diffusion nodes FD1 and FD2, which are electrically connected to each other in the LCG mode, may be sampled and held in the second reset capacitor C_RST1 and the second signal capacitor C_SIG1, respectively. Afterward, in the read-out period ROP, a read-out operation may be performed on the reset level and signal level that are sampled and held.

Figure 4B:
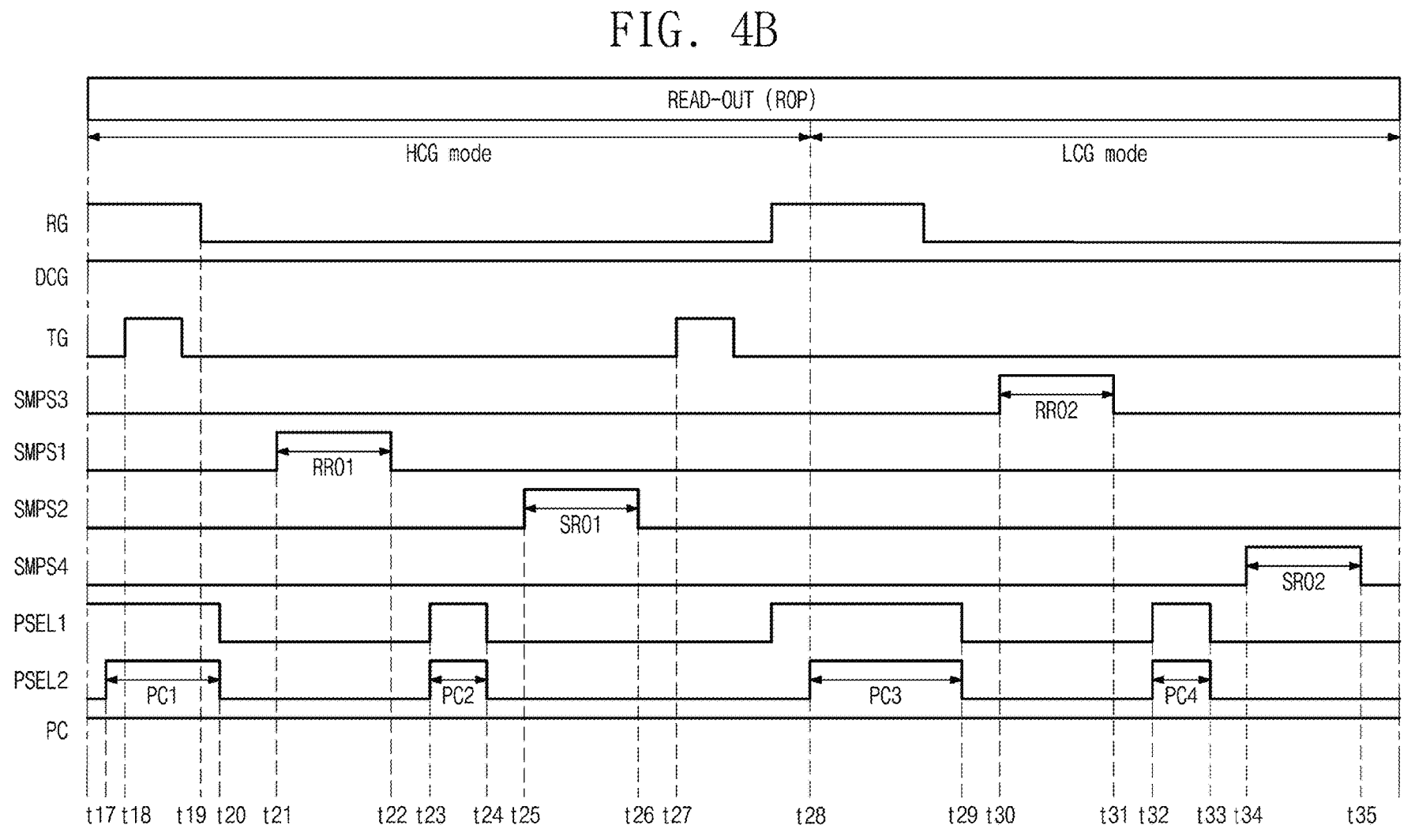

Referring to FIG. 4B, a read-out operation in the HCG mode may be performed.

From time t17 to time t20, both the first precharge select control signal PSEL1 and the second precharge select control signal PSEL2 may be at high levels. Accordingly, both the first precharge select transistor PSX1 and the second precharge select transistor PSX2 are turned on, and thus the first output node NO1 and the second output node NO2 may be precharged. Accordingly, as the output nodes NO1 and NO2 are precharged, noise caused by charges remaining in the output nodes NO1 and NO2 may be removed.

In some example embodiments of the present inventive concepts, during the first precharging time PC1, the reset transistor RX and the dual conversion gain transistor DCGX may be turned on additionally. For example, from time t17 to time t19, the reset control signal RG and the dual conversion control signal DCG may be at high levels. Both the reset transistor RX and the dual conversion gain transistor DCGX are turned on, and thus voltage levels of the floating diffusion nodes FD1 and FD2 may be reset.

Figure 6A:
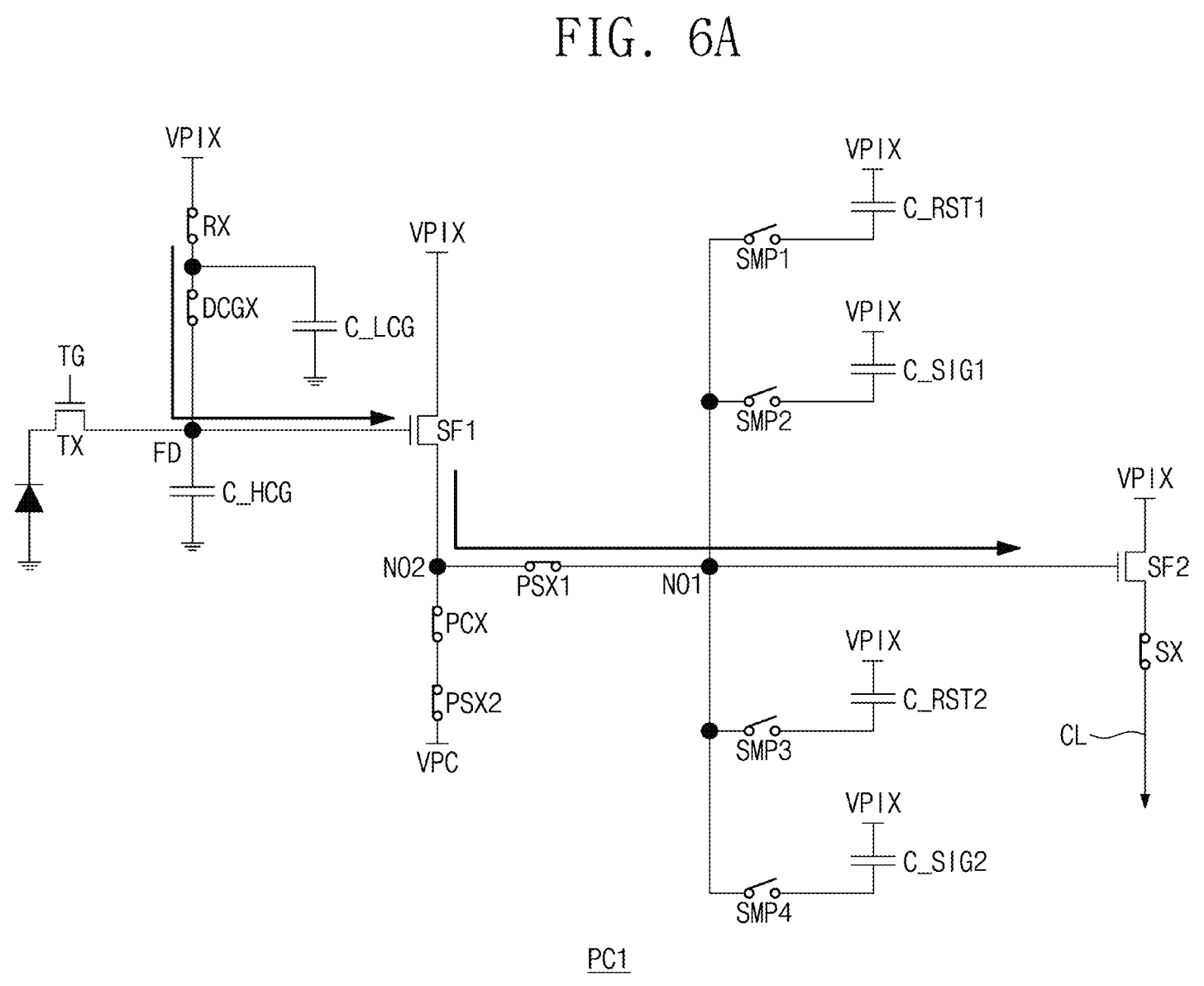

In this case, as shown in FIG. 6A, voltage levels of the floating diffusion nodes FD1 and FD2, which are reset levels, may be delivered to the first and second output nodes NO1 and NO2 through the first source follower SF1. Accordingly, each of the first and second output nodes NO1 and NO2 may be reset to a pixel voltage. As such, noise caused by charges remaining in the first and second output nodes NO1 and NO2 may be stably removed by resetting the first and second output nodes NO1 and NO2 by using voltage levels of the floating diffusion nodes FD1 and FD2, which are reset levels. Furthermore, because the voltage levels of the floating diffusion nodes FD1 and FD2, which are reset levels, are used, a separate reset transistor or clear transistor may not be required to remove charges remaining at the output nodes NO1 and NO2. As a result, an area required to implement the pixel PX according to some example embodiments of the present inventive concepts may be reduced. A period from time t17 to time t20 may be referred to as a "first precharging time" (hereinafter referred to as "PC1") or a "reset time".

In the meantime, at time t18, it is shown that the transfer control signal TG transitions from a low level to a high level. However, this is only an example. The transfer control signal may continuously maintain a low level.

From time t20 to time t21, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

Figure 6B:
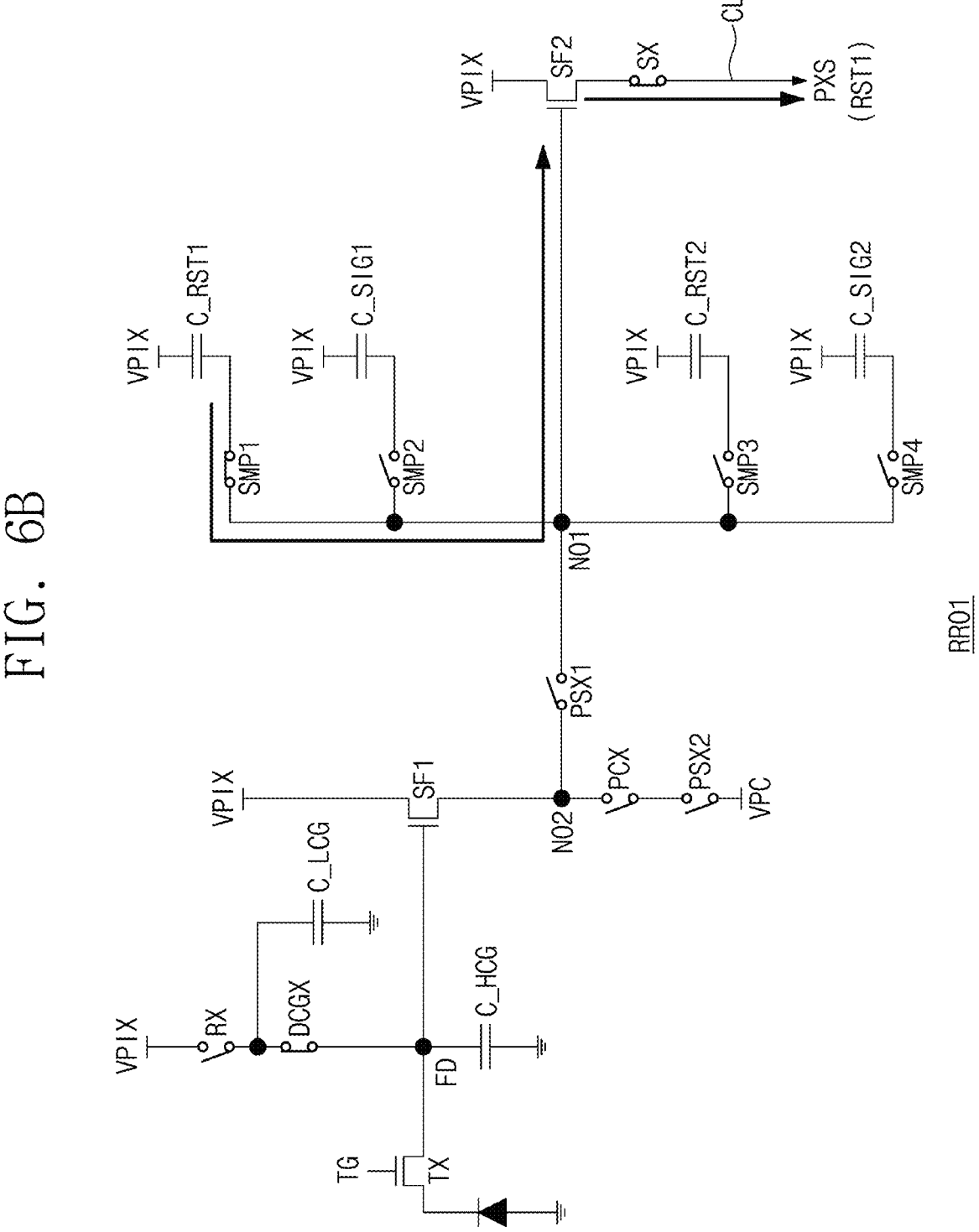

From time t21 to time t22, the first sampling control signal SMPS1 may be at a high level. Accordingly, the first sampling transistor SMP1 may be turned on (e.g., to sample a charge that is stored in the first reset capacitor C_RST1), and thus the first output node NO1 may be electrically connected to the first reset capacitor C_RST1. As a result, as shown in FIG. 6B, charges sampled in the first reset capacitor C_RST1 are delivered to the second source follower SF2 through the first output node NO1, and a first reset signal RST1 corresponding to a reset level in the HCG mode may be output to the column line CL. The first reset signal RST1 may be referred to as an HCG mode reset signal (hereinafter referred to as "HCG RST"). A period from time t21 to time t22 may be referred to as "HCG mode reset read-out time" (hereinafter referred to as "HCG RRO") or "first reset read-out time" (hereinafter referred to as "RRO1").

From time t22 to time t23, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

Figure 6C:
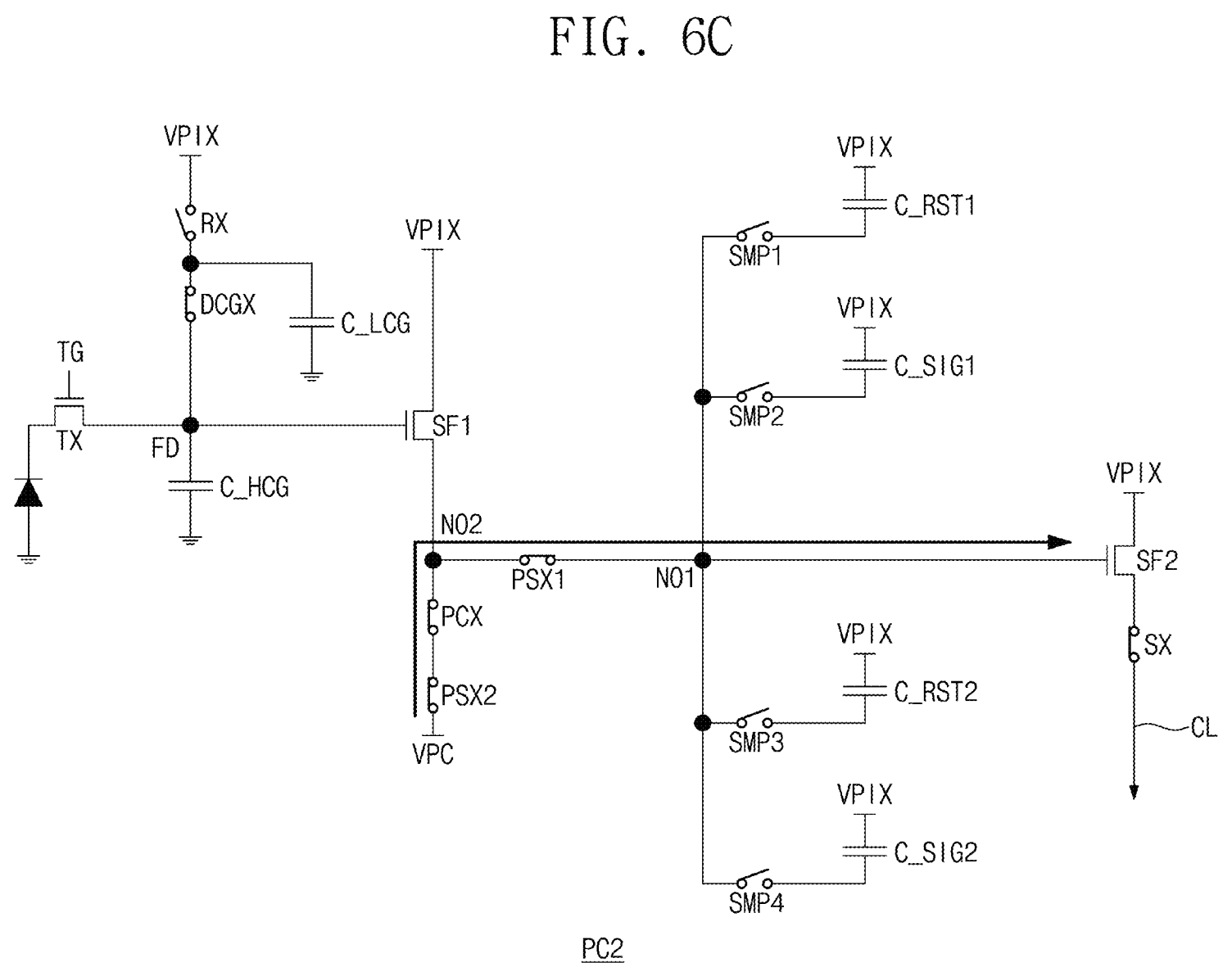

From time t23 to time t24, both the first precharge select control signal PSEL1 and the second precharge select control signal PSEL2 may be at high levels. Accordingly, both the first precharge select transistor PSX1 and the second precharge select transistor PSX2 may be turned on. As a result, as illustrated in FIG. 6C, the first output node NO1 and the second output node NO2 may be precharged, and thus noise caused by charges remaining in the first and second output nodes NO1 and NO2 may be removed. A period from time t23 to time t24 may be referred to as a "second precharging time" (hereinafter referred to as "PC2").

In the meantime, in FIGS. 4B and 6C, during the second precharging time PC2, the reset control signal RG is at a low level and the reset transistor RX is turned off. However, this is an example. The present inventive concepts are not limited thereto. According to some example embodiments, similarly to the first precharging time PC1, even during the second precharging time PC2, the reset transistor RX and the dual conversion gain transistor DCGX may be turned on additionally. In other words, the first and second output nodes NO1 and NO2 may be reset additionally by using voltage levels of the floating diffusion nodes FD1 and FD2, which are reset levels.

From time t24 to time t25, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

Figure 6D:
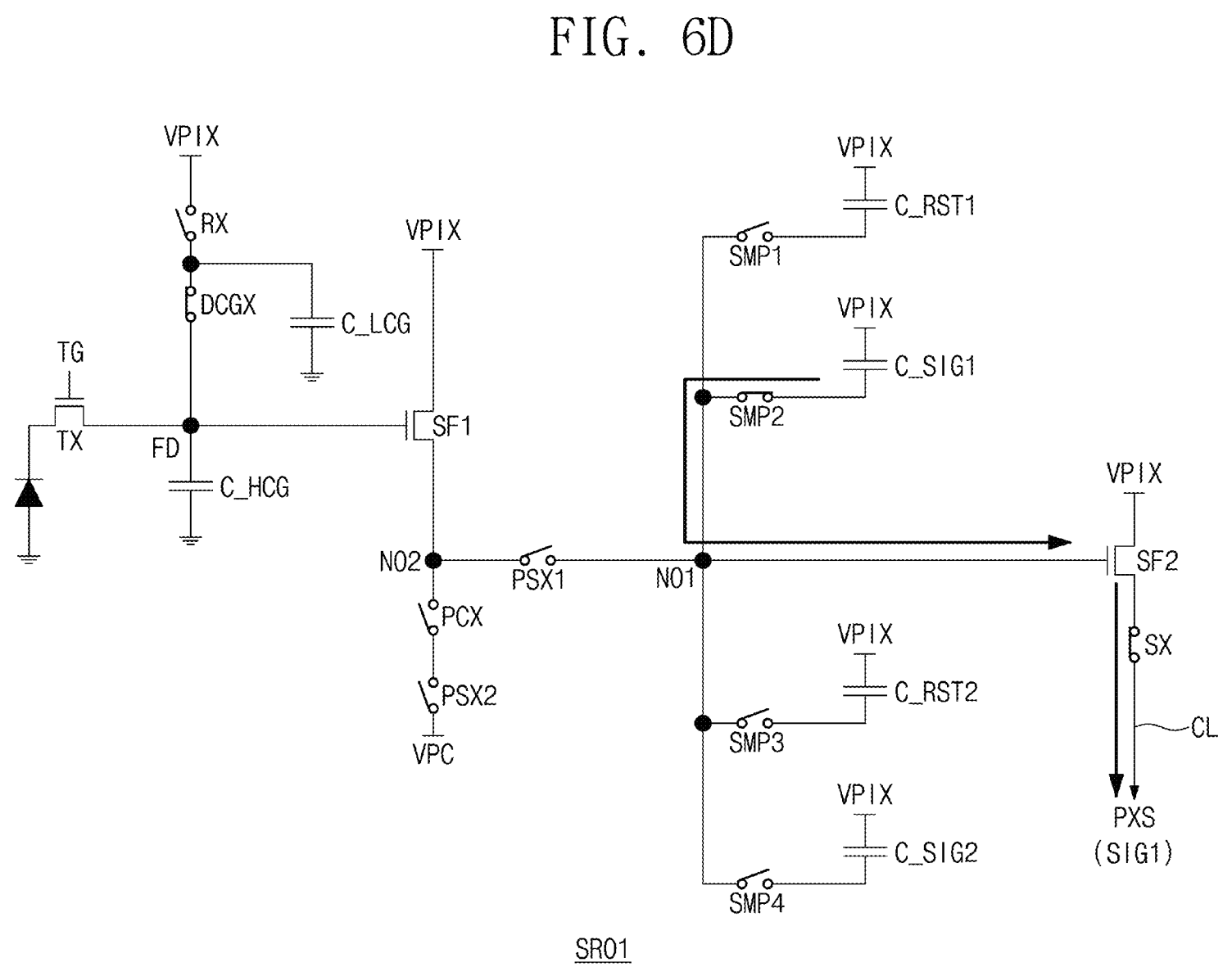

From time t25 to time t26, the second sampling control signal SMPS2 may be at a high level. Accordingly, the second sampling transistor SMP2 may be turned on (e.g., to sample a charge that is stored in the first signal capacitor C_SIG1), and thus the first output node NO1 may be electrically connected to the first signal capacitor C_SIG1. As a result, as shown in FIG. 6D, charges sampled in the first signal capacitor C_SIG1 are delivered to the second source follower SF2 through the first output node NO1, and a first image signal SIG1 corresponding to a signal level in the HCG mode may be output to the column line CL. The first image signal SIG1 may be referred to as an HCG mode image signal (hereinafter referred to as "HCG SIG"). A period from time t25 to time t26 may be referred to as "HCG mode signal read-out time" (hereinafter referred to as "HCG RRO") or "first signal read-out time" (hereinafter referred to as "SRO1").

As such, during the read-out period in the HCG mode, the first reset signal RST1 and the first image signal SIG1 may be output through the column line CL, and the read-out circuit 130 (see FIG. 1) may generate the image data ID in the HCG mode by using the first reset signal RST1 and the first image signal SIG1.

From time t26 to time t27, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

Continuing to refer to FIG. 4B, a read-out operation in the LCG mode may be performed.

From time t28 to time t29, both the first precharge select control signal PSEL1 and the second precharge select control signal PSEL2 may be at high levels. Accordingly, both the first precharge select transistor PSX1 and the second precharge select transistor PSX2 are turned on, and thus the first output node NO1 and the second output node NO2 may be precharged. Accordingly, as the output nodes NO1 and NO2 are precharged, noise caused by charges remaining in the output nodes NO1 and NO2 may be removed. A period from time t28 to time t29 may be referred to as a "third precharging time" (hereinafter referred to as "PC3").

In some example embodiments, similarly to the first precharging time PC1, even during the third precharging time PC3, the reset transistor RX and the dual conversion gain transistor DCGX may be turned on. That is, the voltage level of the floating diffusion nodes FD1 and FD2 may be reset, and the first and second output nodes NO1 and NO2 may also be reset to the pixel voltage. However, this is only an example. During the third precharging time PC3, at least one of the reset transistor RX or the dual conversion gain transistor DCGX may be turned off.

From time t29 to time t30, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

Figure 6E:
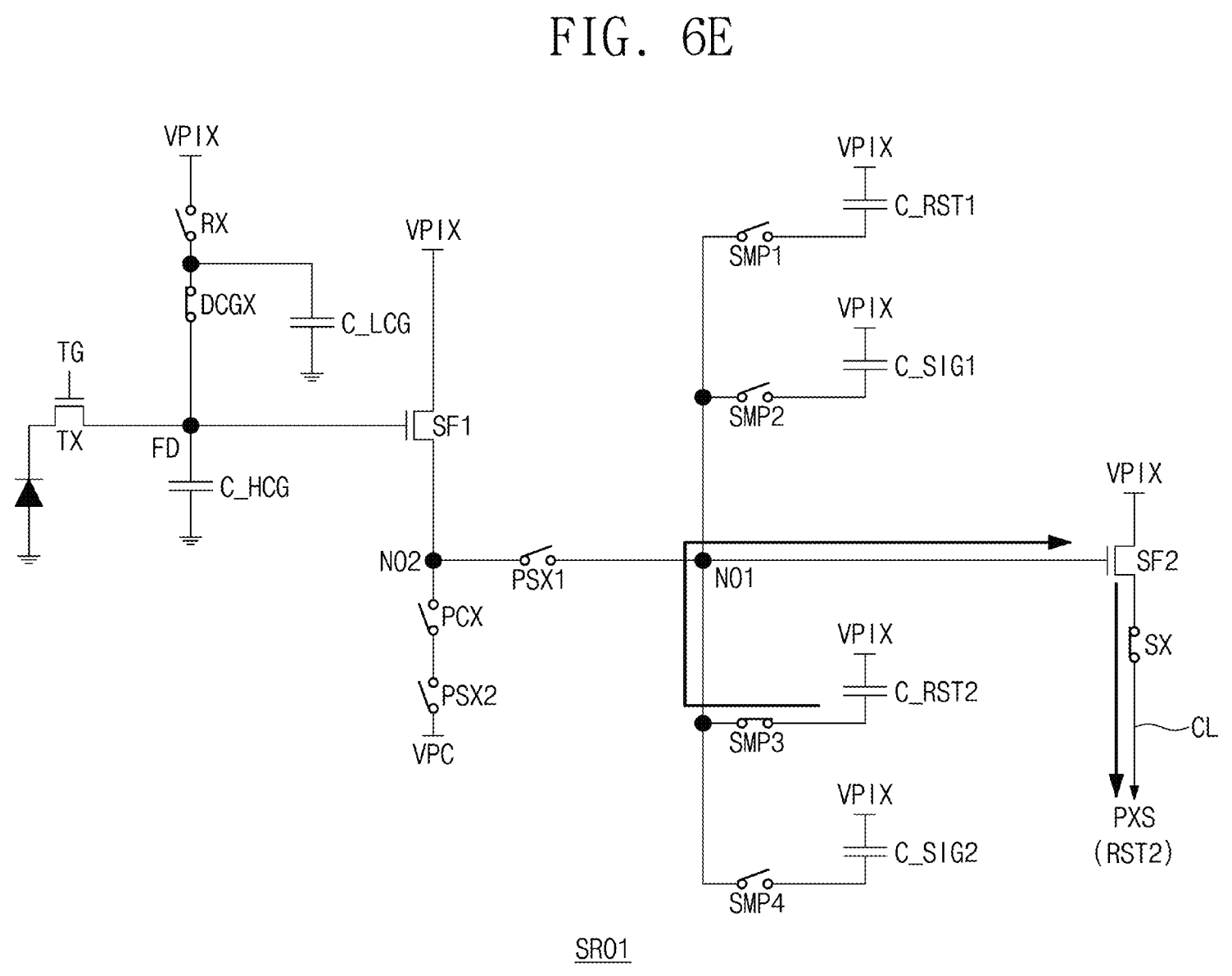

From time t30 to time t31, the third sampling control signal SMPS3 may be at a high level. Accordingly, the third sampling transistor SMP3 may be turned on (e.g., to sample a charge that is stored in the second reset capacitor C_RST2), and thus the first output node NO1 and the second reset capacitor C_RST2 may be electrically connected to each other. As a result, as shown in FIG. 6E, charges sampled in the second reset capacitor C_RST2 are delivered to the second source follower SF2 through the first output node NO1, and a second reset signal RST2 corresponding to a reset level in the LCG mode may be output to the column line CL. The second reset signal RST2 may be referred to as an LCG mode reset signal (hereinafter referred to as "LCG RST"). A period from time t30 to time t31 may be referred to as "LCG mode reset read-out time" (hereinafter referred to as "LCG RRO") or "second reset read-out time" (hereinafter referred to as "RRO2").

From time t31 to time t32, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

From time t32 to time t33, both the first precharge select control signal PSEL1 and the second precharge select control signal PSEL2 may be at high levels. Accordingly, both the first precharge select transistor PSX1 and the second precharge select transistor PSX2 may be turned on. Accordingly, the first output node NO1 and the second output node NO2 may be precharged, and thus noise caused by charges remaining in the first and second output nodes NO1 and NO2 may be removed. A period from time t32 to time t33 may be referred to as a "fourth precharging time" (hereinafter referred to as "PC4").

In the meantime, according to some example embodiments, during the fourth precharging time PC4, the reset transistor RX and the dual conversion gain transistor DCGX may be turned on additionally.

From time t33 to time t34, both the first precharge select control signal PSEL1 and the second precharge select control signal PSEL2 may be at low levels. Accordingly, the first and second precharge select transistors PSX1 and PSX2 may be turned off, and thus the first output node NO1 may be electrically separated from the second output node NO2.

Figure 6F:
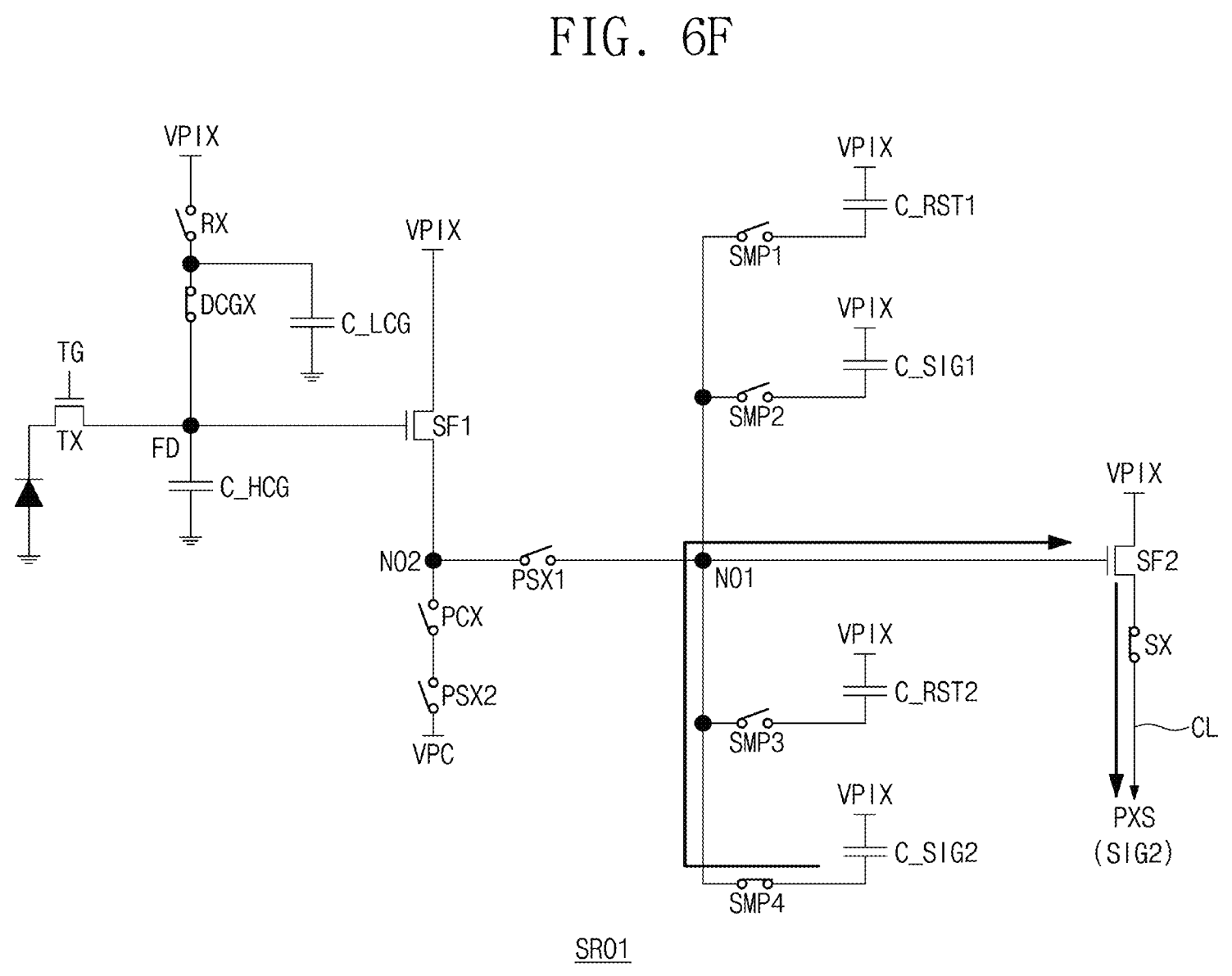

From time t34 to time t35, the fourth sampling control signal SMPS4 may be at a high level. Accordingly, the fourth sampling transistor SMP4 may be turned on (e.g., to sample a charge that is stored in the second signal capacitor C_SIG2), and thus the first output node NO1 may be electrically connected to the second signal capacitor C_SIG2. As a result, as shown in FIG. 6F, charges sampled in the second signal capacitor C_SIG2 are delivered to the second source follower SF2 through the first output node NO1, and a second image signal SIG2 corresponding to a signal level in the LCG mode may be output to the column line CL. The second image signal SIG2 may be referred to as an LCG mode image signal (hereinafter referred to as "LCG SIG"). A period from time t34 to time t35 may be referred to as "LCG mode signal read-out time" (hereinafter referred to as "LCG RRO") or "second signal read-out time" (hereinafter referred to as "SRO2").

As such, during the read-out period in the LCG mode, the second reset signal RST2 and the second image signal SIG2 may be output through the column line CL, and the read-out circuit 130 may generate the image data ID in the LCG mode by using the second reset signal RST2 and the second image signal SIG2.

Afterward, the image sensor 100 according to some example embodiments of the present inventive concepts may generate an image with HDR by synthesizing image data in the HCG mode and image data in the LCG mode.

Figure 7:
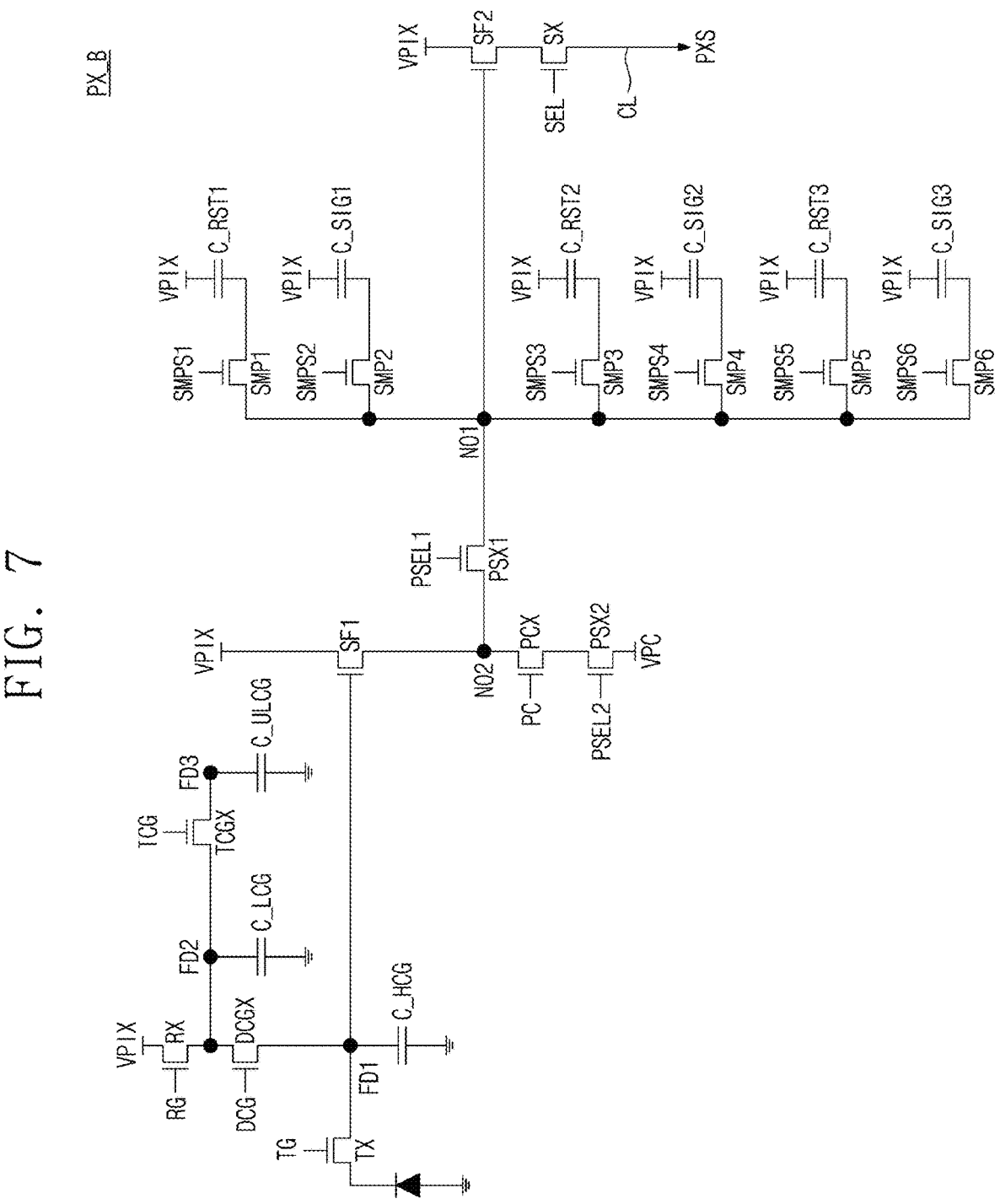
FIG. 7 is a circuit diagram for describing another example of the pixel PX_A of FIG. 3 according to some example embodiments of the present inventive concepts.

FIG. 7 is a circuit diagram for describing another example of the pixel PX_A of FIG. 3 according to some example embodiments of the present inventive concepts. A pixel PX_B in FIG. 7 is similar to the pixel PX_A in FIG. 3. Accordingly, the same or similar configurations are described by using the same or similar reference numerals, and redundant descriptions will be omitted below.

Unlike the pixel PX_A of FIG. 3 that supports a DCG mode, the pixel PX_B of FIG. 7 may support a triple conversion gain (TCG) mode. That is, the pixel PX_B of FIG. 7 may support an ultra conversion gain (ULCG) mode as well as an HCG mode and an LCG mode. To this end, the pixel PX_B of FIG. 7 may further include a triple conversion gain transistor TCGX, a ULCG capacitor C_ULCG, fifth and sixth sampling transistors SMP5 and SMP6, a third reset capacitor C_RST3, and a third signal capacitor C_SIG3.

The triple conversion gain transistor TCGX may be positioned between the second floating diffusion node FD2 and a third floating diffusion node FD3. The triple conversion gain transistor TCGX may be turned on or off in response to a triple conversion control signal TCG received from the row driver 120 and may electrically connect or disconnect the second floating diffusion node FD2 and the third floating diffusion node FD3.

One end of the ULCG capacitor C_ULCG may be connected to the third floating diffusion node FD3. The ULCG capacitor C_ULCG may have a larger capacity than the HCG capacitor C_HCG and the LCG capacitor C_LCG. For example, the ULCG capacitor C_ULCG may be implemented as a capacitor for the memory of DRAM. Accordingly, the ULCG capacitor C_ULCG may have a dramatically increased capacity. However, this is only an example, and the ULCG capacitor C_ULCG may be implemented by using separate conductive electrodes.

In some example embodiments, in the ULCG mode, both the dual conversion gain transistor DCGX and the triple conversion gain transistor TCGX may be turned on such that the ULCG capacitor C_ULCG is electrically connected to the first floating diffusion node FD1 and the second floating diffusion node FD2. In this case, the first to third floating diffusion nodes FD1, FD2, and FD3 may be electrically connected to one another, and thus the capacities of the first to third floating diffusion nodes FD1, FD2, and FD3 may increase to the sum of the capacity of the HCG capacitor C_HCG, the capacity of the LCG capacitor C_LCG, and the capacity of the ULCG capacitor C_ULCG. Accordingly, even when the light intensity is very strong, charges generated by the photodiode PD may be sufficiently accommodated by the capacitors C_HCG, C_LCG, and C_ULCG. In this case, voltage levels of the floating diffusion nodes FD1, FD2, and FD3 may be determined depending on the amount of charge integrated in the HCG capacitor C_HCG, the LCG capacitor C_LCG, and the ULCG capacitor C_ULCG.

Continuing to refer to FIG. 7, the fifth sampling transistor SMP5 may be positioned between the first output node NO1 and the third reset capacitor C_RST3. The fifth sampling transistor SMP5 may be turned on or off in response to a fifth sampling control signal SMPS5 received from the row driver 120, and may electrically connect or disconnect the third reset capacitor C_RST3 and the first output node NO1.

The third reset capacitor C_RST3 may be positioned between the fifth sampling transistor SMPS5 and the pixel voltage terminal VPIX. Charges may be integrated in the third reset capacitor C_RST3 depending on a switching operation of the fifth sampling transistor SMPS5. For example, in the ULCG mode, the voltage levels of the floating diffusion nodes FD1, FD2, and FD3 may be reset. In this case (e.g., based on the ULCG capacitor C_ULCG being electrically connected to the first floating diffusion node FD1 and the second floating diffusion node FD2), charges corresponding to reset levels of the floating diffusion nodes FD1, FD2, and FD3 (e.g., a charge corresponding to at least a third reset voltage level of the first floating diffusion node FD1) may be integrated in the third reset capacitor C_RST3.

The sixth sampling transistor SMP6 may be positioned between the first output node NO1 and the third signal capacitor C_SIG3. The sixth sampling transistor SMP6 may be turned on or off in response to a sixth sampling control signal SMPS6 received from the row driver 120, and may electrically connect or disconnect the third signal capacitor C_SIC3 and the first output node NO1.

The third signal capacitor C_SIG3 may be positioned between the sixth sampling transistor SMP6 and the pixel voltage terminal VPIX. Charges may be integrated in the third signal capacitor C_SIG3 depending on a switching operation of the sixth sampling transistor SMP6. For example, in the ULCG mode (e.g., based on the ULCG capacitor C_ULCG being electrically connected to the first floating diffusion node FD1 and the second floating diffusion node FD2), charges generated by the photodiode PD may be integrated in the capacitors C_HCG, C_LCG, and C_ULCG of the floating diffusion nodes FD1, FD2, and FD3. In this case, charges corresponding to signal levels of the floating diffusion nodes FD1, FD2, and FD3 (e.g., a charge corresponding to at least a third signal voltage level of the first floating diffusion node FD1) may be integrated in the third signal capacitor C_SIG3.

In some example embodiments, capacities of the third reset capacitor C_RST3 and the third signal capacitor C_SIG3 corresponding to the ULCG mode may be different from capacities of the other reset capacitors C_RST1 and C_RST2 and the other signal capacitors C_SIG1 and C_SIG2. For example, capacities of the third reset capacitor C_RST3 and the third signal capacitor C_SIG3 corresponding to the ULCG mode may be smaller than capacities of the other reset capacitors C_RST1 and C_RST2 and the other signal capacitors C_SIG1 and C_SIG2. However, this is only an example. According to some example embodiments, capacities of the third reset capacitor C_RST3 and the third signal capacitor C_SIG3 corresponding to the ULCG mode may be the same as capacities of the other reset capacitors C_RST1 and C_RST2 and the other signal capacitors C_SIG1 and C_SIG2.

Figure 8A:
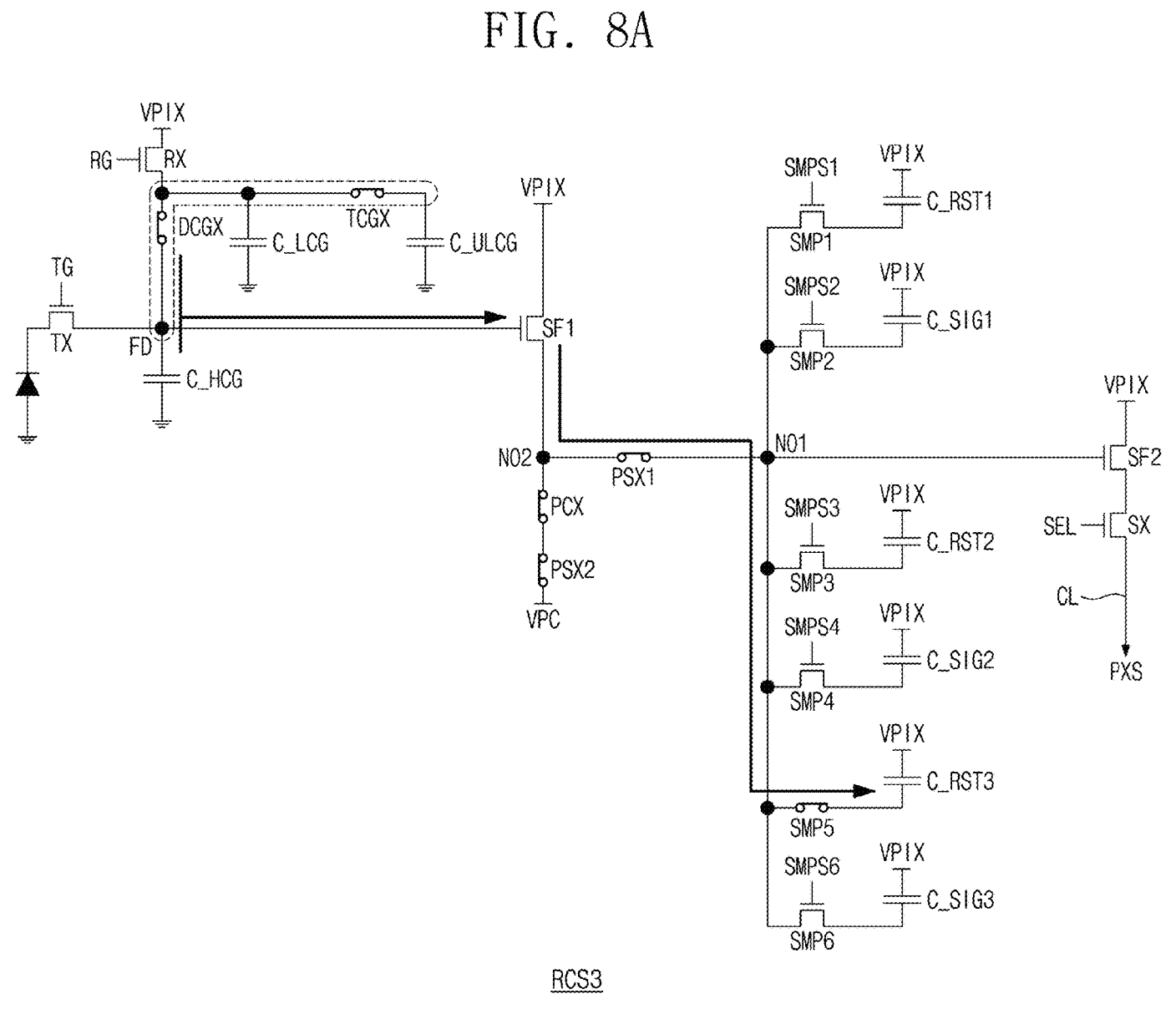
Figure 8B:
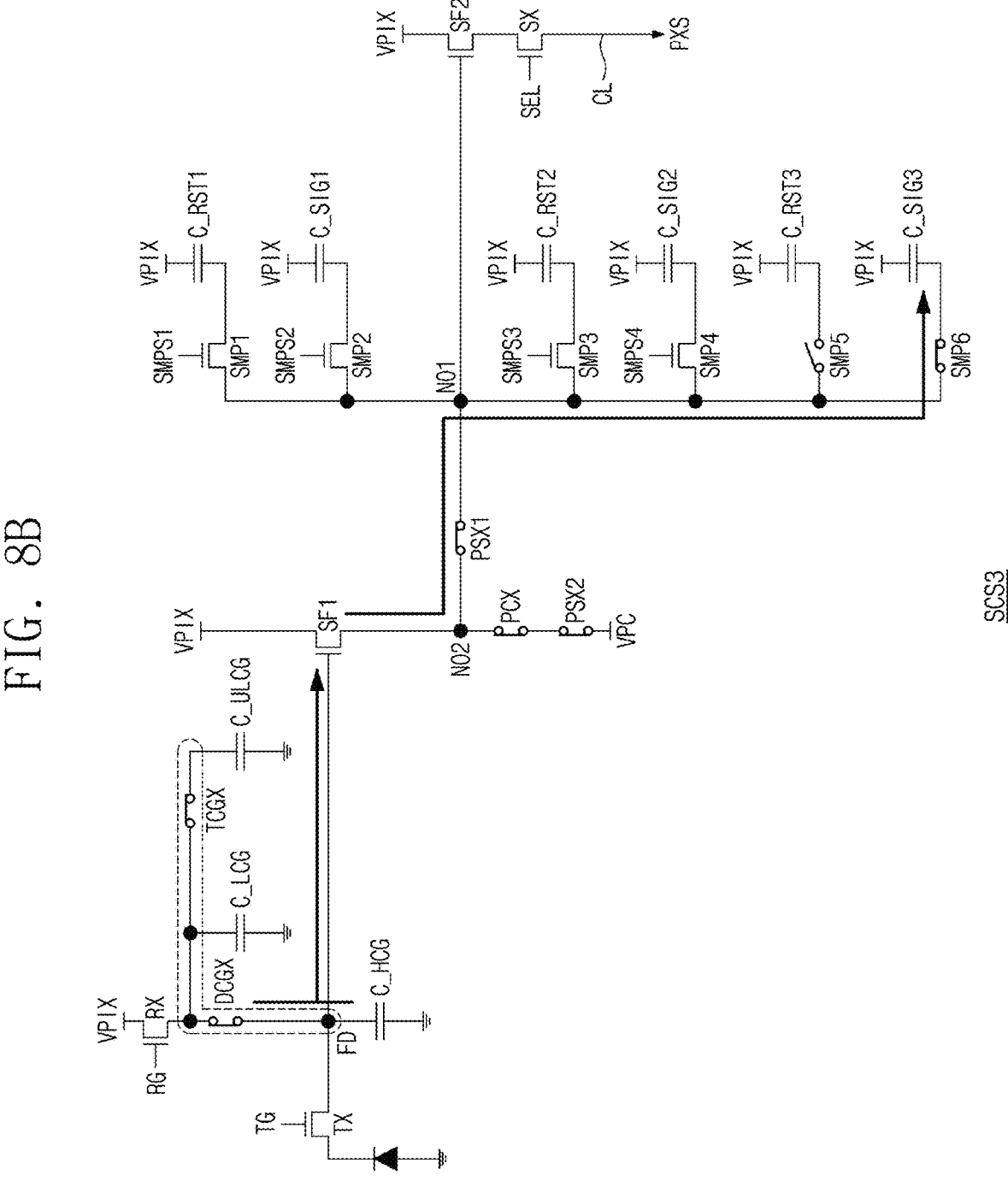

FIGS. 8A and 8B are diagrams showing an example of an operation of the pixel PX_B of FIG. 7 in the global signal dump period GSDP according to some example embodiments of the present inventive concepts. An operation of the pixel PX_B in FIGS. 8A and 8B is similar to that of the pixel PX_A in FIGS. 4A and 5A to 5D. Accordingly, for convenience of description, redundant descriptions will be omitted below. It will be understood that an image sensor (e.g., image sensor 100 shown in FIG. 1) may be configured to operate in order to operate and/or control one or more pixels PX (e.g., the pixel PX_B shown in FIG. 7) as shown in FIGS. 8A and 8B, for example based on causing one or more control signals to be provided to the pixel as shown in FIGS. 8A and 8B. For example, the image sensor may be configured to operate such that one or more of the operations described with reference to FIGS. 8A and 8B occur.

As described above in FIGS. 4A and 5A to 5D, the global signal dump period GSDP of the pixel PX_A supporting a DCG mode may include the first reset settling time RCS1, the second reset settling time RCS2, the first signal settling time SCS1, and the second signal settling time SCS2. In addition, the global signal dump period GSDP of the pixel PX_B of FIG. 7 supporting a TCG mode may further include a third reset settling time RCS3 and a third signal settling time SCS3.

In more detail, for example, as shown in FIG. 8A, during the third reset settling time RCS3, the dual conversion gain transistor DCGX and the triple conversion gain transistor TCGX may be turned on. Accordingly, the voltage levels of the floating diffusion nodes FD1, FD2, and FD3, which are reset levels in the ULCG mode, may be provided to the first source follower SF1. Besides, the first precharge select transistor PSX1 and the fifth sampling transistor SMP5 may be turned on. Accordingly, the voltage levels of the floating diffusion nodes FD1, FD2, and FD3, which are reset levels in the ULCG mode, may be sampled in the third reset capacitor C_RST3.

Moreover, for example, as shown in FIG. 8B, during the third signal settling time SCS3, the dual conversion gain transistor DCGX and the triple conversion gain transistor TCGX may be turned on. Accordingly, the voltage levels of the floating diffusion nodes FD1, FD2, and FD3, which are signal levels in the ULCG mode, may be provided to the first source follower SF1. Besides, the first precharge select transistor PSX1 and the sixth sampling transistor SMP6 may be turned on. Accordingly, the voltage levels of the floating diffusion nodes FD1, FD2, and FD3, which are signal levels in the ULCG mode, may be sampled in the third signal capacitor C_SIC3.

Figure 9A:
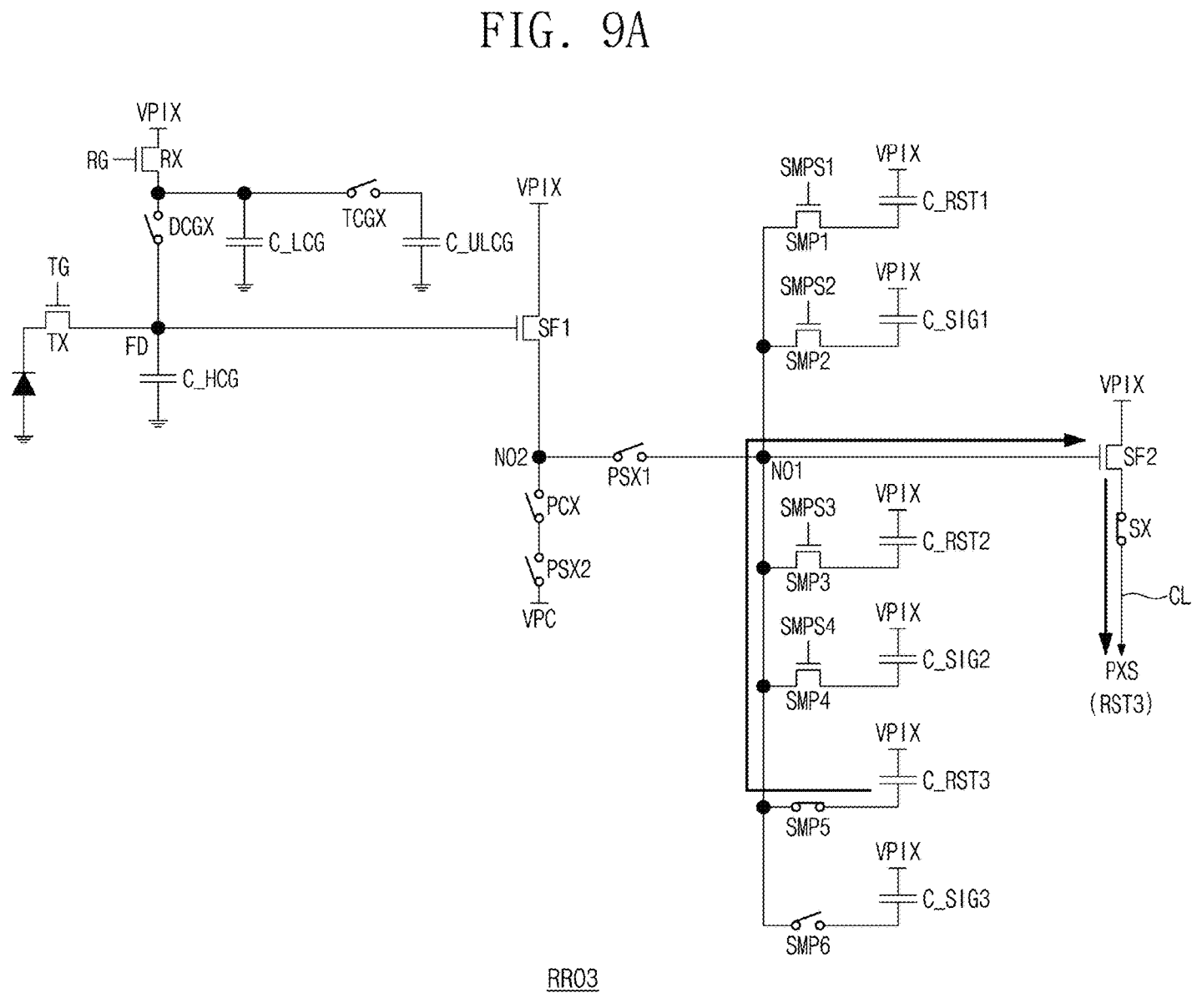
Figure 9B:
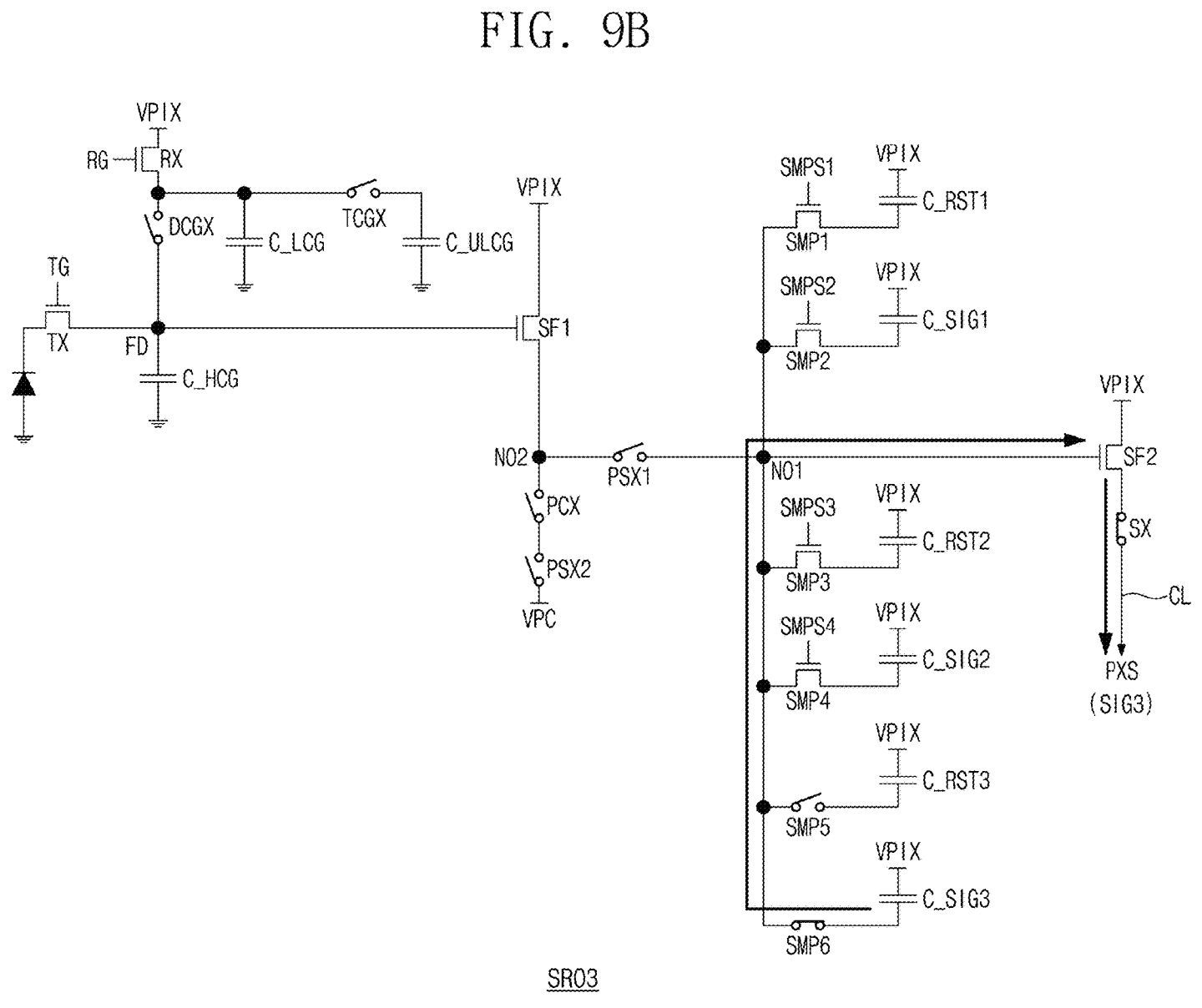

FIGS. 9A and 9B are diagrams showing an example of an operation of the pixel PX_B of FIG. 7 in the read-out period ROP according to some example embodiments of the present inventive concepts. An operation of the pixel PX_B in FIGS. 9A and 9B is similar to that of the pixel PX_A in FIGS. 4B and 6A to 6F. Accordingly, for convenience of description, redundant descriptions will be omitted below. It will be understood that an image sensor (e.g., image sensor 100 shown in FIG. 1) may be configured to operate in order to operate and/or control one or more pixels (e.g., the pixel PX_B shown in FIG. 7) as shown in FIGS. 9A and 9B, for example based on causing one or more control signals to be provided to the pixel as shown in FIGS. 9A and 9B. For example, the image sensor may be configured to operate such that one or more of the operations described with reference to FIGS. 9A and 9B occur.

As described above in FIGS. 4B and 6A to 6F, the read-out period ROP of the pixel PX_A supporting a DCG mode may include first to fourth precharging times PC1 to PC4, first and second reset read-out times RRO1 and RRO2, and first and second signal read-out times SRO1 and SRO2. In addition, the read-out period ROP of the pixel PX_B of FIG. 7 supporting the TCG mode may further include a third reset read-out time RRO3 and a third signal read-out time SRO3.

For example, as shown in FIG. 9A, during the third reset read-out time RRO3, the first precharge select transistor PSX1 may be turned off, and the fifth sampling transistor SMP5 may be turned on. Accordingly, charges sampled in the third reset capacitor C_RST3 are delivered to the second source follower SF2 through the first output node NO1, and a third reset signal RST3 corresponding to a reset level in the ULCG mode may be output to the column line CL.

Moreover, as shown in FIG. 9B, during the third signal read-out time SRO3, the first precharge select transistor PSX1 may be turned off, and the sixth sampling transistor SMP6 may be turned on. Accordingly, charges sampled in the third signal capacitor C_SIG3 are delivered to the second source follower SF2 through the first output node NO1, and a third image signal SIG3 corresponding to a signal level in the ULCG mode may be output to the column line CL.

As described in FIGS. 8A to 9B, during the read-out period in the ULCG mode, the third reset signal RST3 and the third image signal SIG3 may be output through the column line CL, and the read-out circuit 130 may generate the image data ID in the ULCG mode by using the third reset signal RST3 and the third image signal SIG3. As a result, the image sensor 100 according to some example embodiments of the present inventive concepts may have a wider HDR.

Meanwhile, the description above is an example, and it may be understood that the scope and spirit of the present inventive concepts is not limited thereto. For example, the arrangements of transistors and/or capacitors of the pixel circuits of FIGS. 3 and 7 may be variously changed, which may fall within the scope of the present inventive concepts.

Hereinafter, some of various examples capable of being changed by using the pixel circuits of FIGS. 3 and 7 will be described in more detail.

FIGS. 10 to 13 are diagrams showing an example of pixels, according to some example embodiments of the present inventive concepts. Each of pixels PX_C, PX_D, PX_E, and PC_F of FIGS. 10 to 13 is similar to the pixel PX_A of FIG. 3. Accordingly, the same or similar configurations are described by using the same or similar reference numerals, and redundant descriptions will be omitted below.

In some example embodiments of the present inventive concepts, the arrangement of the first precharge select transistor PSX1, the second precharge select transistor PSX2, and the precharge transistor PCX included in the pixel PX_A of FIG. 3 may be variously changed.

Figure 10:
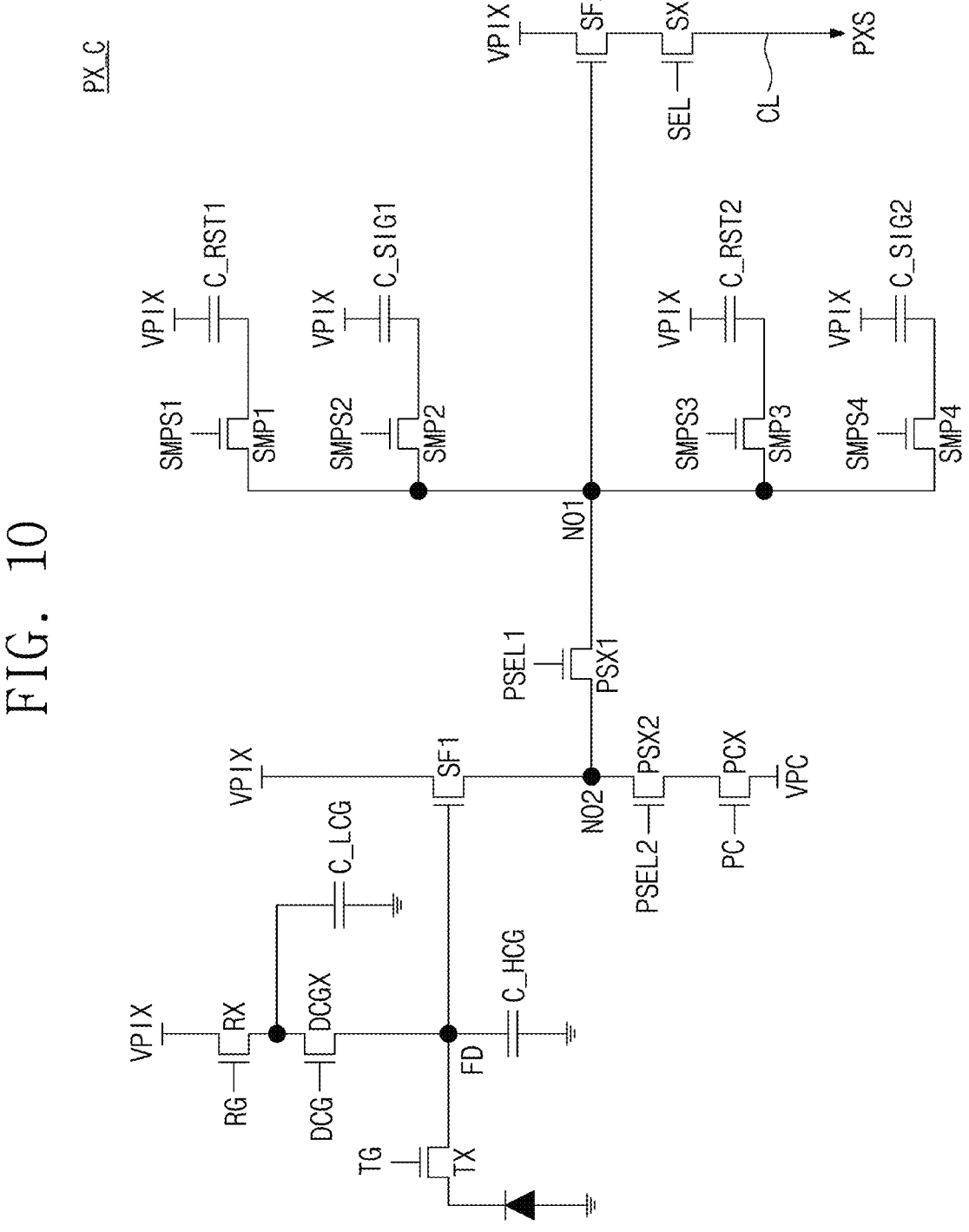
FIGS. 10, 11, 12, and 13 are diagrams showing an example of pixels, according to some example embodiments of the present inventive concepts.

For example, as shown in FIG. 10, in a pixel PX_C the second precharge select transistor PSX2 may be changed to be positioned between the second output node NO2 and the precharge transistor PCX. The precharge transistor PCX may be changed to be positioned between the second precharge select transistor PSX2 and the precharge voltage terminal VPC.

Figure 11:
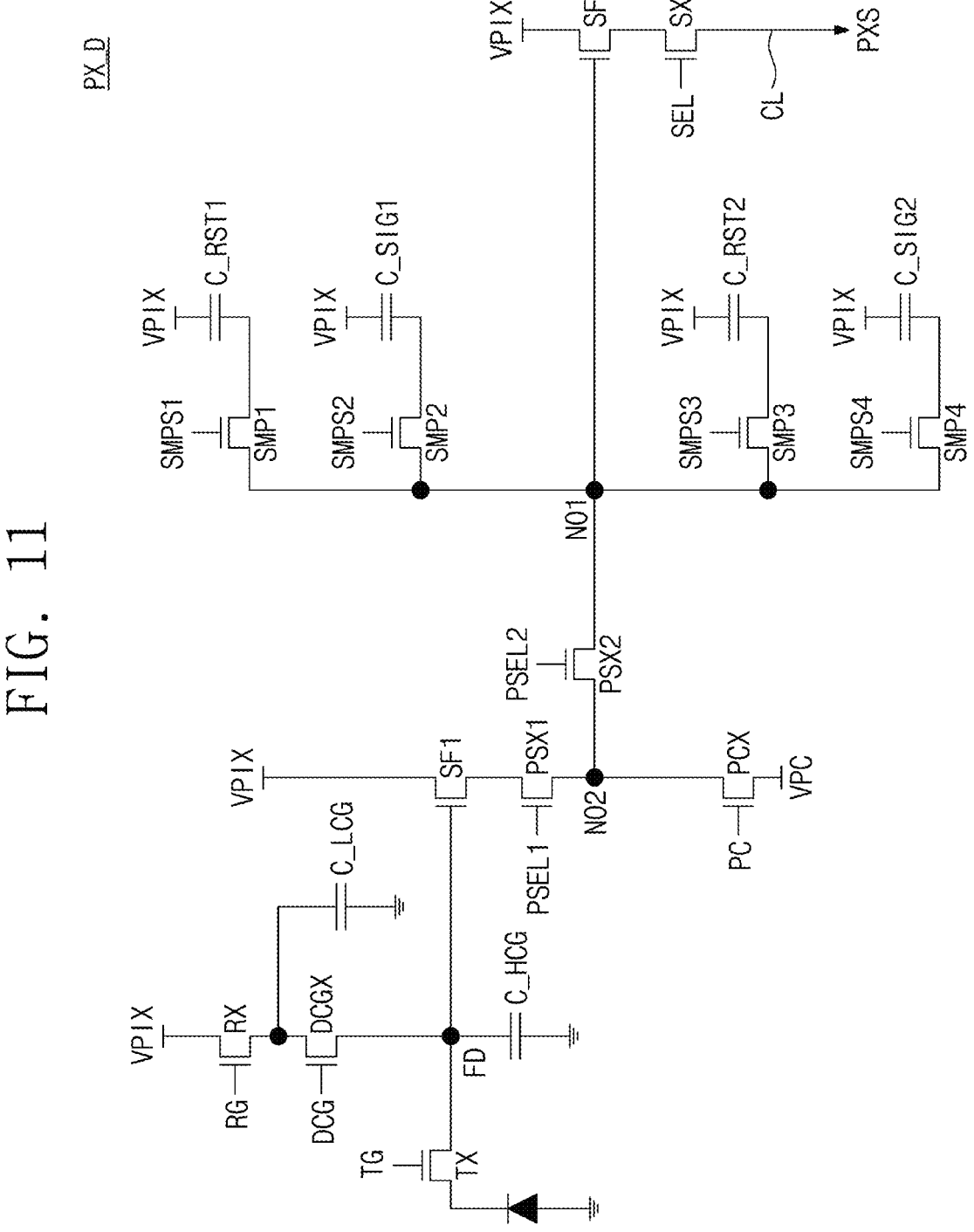

For example, as shown in FIG. 11, in a pixel PX_D the second precharge select transistor PSX2 may be changed to be positioned between the first output node NO1 and the second output node NO2. The first precharge select transistor PSX1 may be changed to be positioned between the first source follower SF1 and the second output node NO2. The precharge transistor PCX may be changed to be positioned between the second output node NO2 and the precharge voltage terminal VPC. In this case, the second precharge select transistor PSX2 may be used to selectively deliver a voltage level of the floating diffusion node FD, which is delivered through the first source follower SF1, to the first output node NO1.

Figure 12:
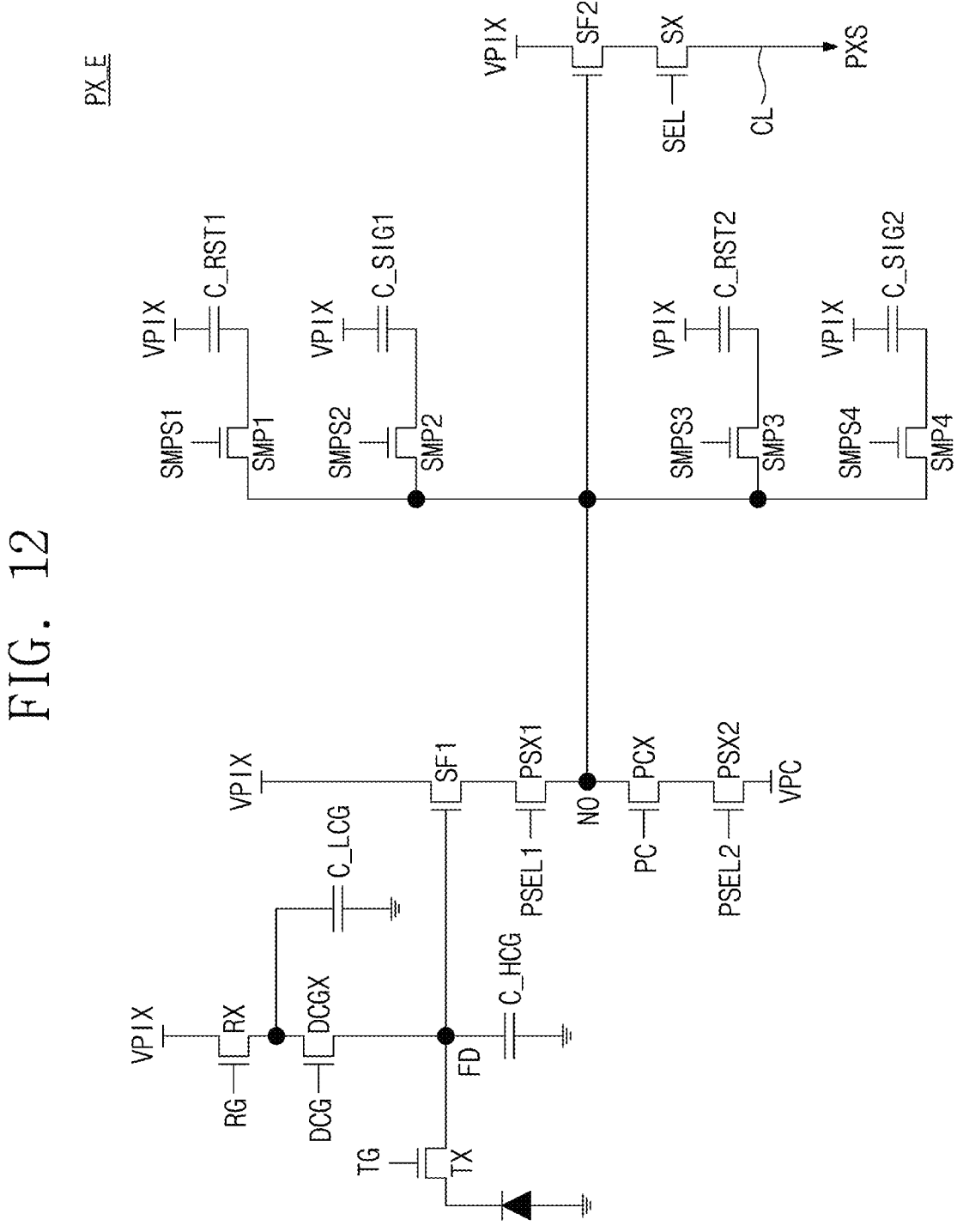

For example, as shown in FIG. 12, in a pixel PX_E the first precharge select transistor PSX1, the precharge transistor PCX, and the second precharge select transistor PSX2 may be connected in series between the first source follower SF1 and the precharge voltage terminal VPC. In this case, the output node NO may be connected to one end of the first precharge select transistor PSX1 and one end of the precharge transistor PCX and thus may be between the first precharge select transistor PSX1 and the precharge transistor PCX.

Figure 13:
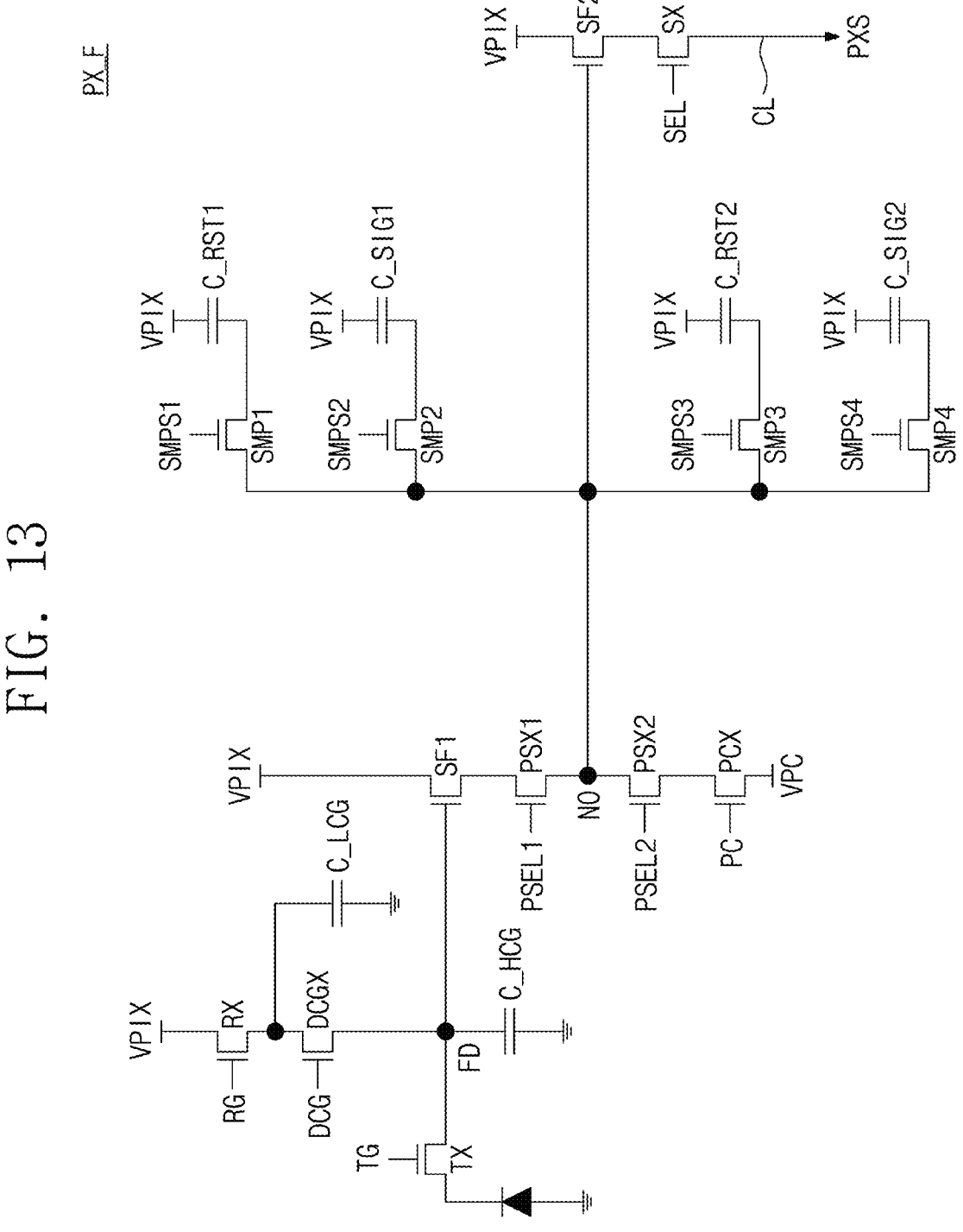

For example, as shown in FIG. 13, in a pixel PX_F the first precharge select transistor PSX1, the second precharge select transistor PSX2, and the precharge transistor PCX may be connected in series between the first source follower SF1 and the precharge voltage terminal VPC. In this case, the output node NO may be connected to one end of the first precharge select transistor PSX1 and one end of the second precharge select transistor PSX2 and thus may be between the first precharge select transistor PSX1 and the second precharge select transistor PSX2.

As described herein, any devices, systems, units, circuits, controllers, processors, and/or portions thereof according to any of the example embodiments (including, for example, the image sensor 100, the pixel array 110, the row driver 120, the read-out circuit 130, the timing controller 140, the correlated double sampling circuit 131, the analog-to-digital converter 132, the buffer 133, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, units, circuits, controllers, processors, and/or portions thereof according to any of the example embodiments.

Example embodiments in which a design is changed simply or which are easily changed may be included in the present inventive concepts as well as some example embodiments described above. In addition, technologies that are easily changed and implemented by using the above embodiments may be included in the present inventive concepts.

According to some example embodiments of the present inventive concepts, an image sensor may have HDR. Accordingly, a high-quality image may be generated.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. An image sensor, comprising:
a plurality of pixels positioned in a plurality of rows and a plurality of columns, wherein each pixel of the plurality of pixels includes
a photodiode configured to generate a charge in response to an incident light;
a first floating diffusion node configured to store the charge generated by the photodiode;
a second floating diffusion node selectively connected to the first floating diffusion node and configured to store the charge generated by the photodiode;
a first capacitor selectively connected to an output node and configured to store a charge corresponding to a first reset voltage level of the first floating diffusion node in a state where the first floating diffusion node is electrically disconnected from the second floating diffusion node;
a second capacitor selectively connected to the output node and configured to store a charge corresponding to a first signal voltage level of the first floating diffusion node in the state where the first floating diffusion node is electrically disconnected from the second floating diffusion node;
a third capacitor selectively connected to the output node and configured to store a charge corresponding to a second reset voltage level of the first floating diffusion node in a state where the first floating diffusion node is electrically connected to the second floating diffusion node;
a fourth capacitor selectively connected to the output node and configured to store a charge corresponding to a second signal voltage level of the first floating diffusion node in the state where the first floating diffusion node is electrically connected to the second floating diffusion node; and
a reset transistor connected between the second floating diffusion node and a pixel voltage terminal, the reset transistor configured to reset the first floating diffusion node and the output node while the first capacitor, the second capacitor, the third capacitor, and the fourth capacitor are electrically disconnected from the output node.

2. The image sensor of claim 1, further comprising:
a source follower configured to amplify and output a voltage level of the first floating diffusion node; and
a precharge select transistor connected between the source follower and the output node,
wherein the image sensor is configured to operate such that, when the output node is reset, the reset transistor and the precharge select transistor are turned on.

3. The image sensor of claim 2, further comprising:
a dual conversion gain transistor connected between the second floating diffusion node and the first floating diffusion node,
wherein the image sensor is configured to operate such that, when the output node is reset, the dual conversion gain transistor is turned on.

4. The image sensor of claim 2, further comprising:
a precharge transistor and an additional precharge select transistor, which are connected between the source follower and a precharge voltage terminal and are serially connected to the source follower,
wherein the image sensor is configured to operate such that, when the output node is reset, the precharge transistor and the additional precharge select transistor are turned on.

5. The image sensor of claim 1, further comprising:
a source follower configured to amplify and output a voltage level of the first floating diffusion node; and
a precharge select transistor connected between the source follower and the output node, and
wherein the image sensor is configured to operate such that, when the output node is precharged, the reset transistor is turned off and the precharge select transistor is turned on.

6. The image sensor of claim 5, further comprising:
a precharge transistor and an additional precharge select transistor, which are connected between the source follower and a precharge voltage terminal and are serially connected to the source follower, and
wherein the image sensor is configured to, when the output node is precharged, cause the precharge transistor and the additional precharge select transistor to be turned on.

7. The image sensor of claim 1, wherein
a capacity of the first capacitor is greater than a capacity of the third capacitor, and
a capacity of the second capacitor is greater than a capacity of the fourth capacitor.

8. The image sensor of claim 1, further comprising:
an ultra conversion gain (ULCG) capacitor selectively connected to the second floating diffusion node and configured to store the charge generated by the photodiode;
a triple conversion gain transistor positioned between the second floating diffusion node and the ULCG capacitor and configured to selectively connect the ULCG capacitor to the second floating diffusion node;

a fifth capacitor selectively connected to the output node and configured to store a charge corresponding to a third reset voltage level of the first floating diffusion node in a state where the ULCG capacitor is electrically connected to the first floating diffusion node and the second floating diffusion node; and a sixth capacitor selectively connected to the output node and configured to store a charge corresponding to a third signal voltage level of the first floating diffusion node in the state where the ULCG capacitor is electrically connected to the first floating diffusion node and the second floating diffusion node.

9. The image sensor of claim 8, wherein a capacity of the third capacitor is greater than a capacity of the fifth capacitor, and a capacity of the fourth capacitor is greater than a capacity of the sixth capacitor.

10. An image sensor, comprising:

a pixel array including a plurality of pixels, wherein each pixel of the plurality of pixels includes a photodiode configured to generate a charge in response to an incident light;

a high conversion gain (HCG) capacitor corresponding to a first floating diffusion node and configured to integrate the charge generated by the photodiode;

a low conversion gain (LCG) capacitor corresponding to a second floating diffusion node spaced from the first floating diffusion node and configured to integrate the charge generated by the photodiode;

a dual conversion gain transistor configured to electrically connect or disconnect the first floating diffusion node and the second floating diffusion node;

a source follower configured to amplify a voltage level of the first floating diffusion node and to output an amplified voltage level to a first output node;

a first reset capacitor corresponding to a second output node spaced from the first output node and configured to store a charge corresponding to a reset level of the first floating diffusion node in a state where the dual conversion gain transistor is turned off;

a first sampling transistor connected between the first reset capacitor and the second output node and configured to sample a charge that is stored in the first reset capacitor;

a first signal capacitor corresponding to the second output node and configured to store a charge corresponding to a signal level of the first floating diffusion node in the state where the dual conversion gain transistor is turned off;

a second sampling transistor connected between the first signal capacitor and the second output node and configured to sample a charge that is stored in the first signal capacitor;

a second reset capacitor corresponding to the second output node and configured to store a charge corresponding to a reset level of the first floating diffusion node in a state where the dual conversion gain transistor is turned on;

a third sampling transistor connected between the second reset capacitor and the second output node and configured to sample a charge that is stored in the second reset capacitor;

a second signal capacitor corresponding to the second output node and configured to store a charge corresponding to a signal level of the first floating diffusion node in the state where the dual conversion gain transistor is turned on;

a fourth sampling transistor connected between the second signal capacitor and the second output node and configured to sample a charge that is stored in the second signal capacitor;

a precharge select transistor configured to electrically connect and disconnect the first output node and the second output node; and a reset transistor connected between the second floating diffusion node and a pixel voltage terminal, the reset transistor configured to reset the first floating diffusion node and the second output node while the first reset capacitor, the second reset capacitor, the first signal capacitor, and the second signal capacitor are electrically disconnected from the first output node.

11. The image sensor of claim 10, wherein the image sensor is configured to operate such that, during a reset time in a global signal dump period, the reset transistor and the dual conversion gain transistor are turned on.

12. The image sensor of claim 10, wherein the image sensor is configured to operate such that, during a second reset settling time in a global signal dump period, the third sampling transistor is turned on in a state where the reset transistor is turned off and the dual conversion gain transistor is turned on.

13. The image sensor of claim 10, wherein the image sensor is configured to operate such that, during a first reset settling time in a global signal dump period, the first sampling transistor is turned on in a state where each of the reset transistor and the dual conversion gain transistor is turned off.

14. The image sensor of claim 10, wherein the image sensor is configured to operate such that, during a first signal settling time in a global signal dump period, the second sampling transistor is turned on in a state where each of the reset transistor and the dual conversion gain transistor is turned off.

15. The image sensor of claim 10, wherein the image sensor is configured to operate such that, during a second signal settling time in a global signal dump period, the fourth sampling transistor is turned on in a state where the reset transistor is turned off and the dual conversion gain transistor is turned on.

16. The image sensor of claim 10, wherein the image sensor is configured to operate such that, during a first precharging time in a read-out period, the precharge select transistor is turned on in a state where each of the reset transistor and the dual conversion gain transistor is turned on.

17. The image sensor of claim 10, wherein the image sensor is configured to operate such that, during a first reset read-out time in a read-out period, the first sampling transistor is turned on in a state where at least one of the reset transistor or the dual conversion gain transistor is turned off, and the precharge select transistor is turned off, and during a second reset read-out time in the read-out period, the third sampling transistor is turned on in a state where the precharge select transistor is turned off.

18. The image sensor of claim 10, further comprising:

a precharge transistor connected to the first output node, wherein the image sensor is configured to operate such that, during a second precharging time in a read-out period, each of the precharge select transistor and the precharge transistor is turned on in a state where at least one of the reset transistor or the dual conversion gain transistor is turned off.

19. The image sensor of claim 10, wherein the image sensor is configured to operate such that, during a first signal read-out time in a read-out period, the second sampling transistor is turned on in a state where the precharge select transistor is turned off, and during a second signal read-out time in the read-out period, the fourth sampling transistor is turned on in a state where the precharge select transistor is turned off.

\* \* \* \* \*